United States Patent
Joo et al.

(10) Patent No.: US 12,174,685 B2
(45) Date of Patent: *Dec. 24, 2024

(54) APPLICATION PROCESSOR, MOBILE DEVICE HAVING THE SAME, AND METHOD OF SELECTING A CLOCK SIGNAL FOR AN APPLICATION PROCESSOR

(71) Applicant: SAMSUNG ELECTRONICS CO., LTD., Suwon-si (KR)

(72) Inventors: Young-Pyo Joo, Seoul (KR); Taek-Kyun Shin, Gwangmyeong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

This patent is subject to a terminal disclaimer.

(21) Appl. No.: 18/156,662

(22) Filed: Jan. 19, 2023

(65) Prior Publication Data

US 2023/0152875 A1    May 18, 2023

Related U.S. Application Data

(63) Continuation of application No. 17/000,750, filed on Aug. 24, 2020, now Pat. No. 11,561,600, which is a (Continued)

(30) Foreign Application Priority Data

Oct. 19, 2012   (KR) ................. 10-2012-0116507

(51) Int. Cl.
*G06F 1/00*    (2006.01)
*G06F 1/06*    (2006.01)
(Continued)

(52) U.S. Cl.
CPC ............... *G06F 1/324* (2013.01); *G06F 1/06* (2013.01); *G06F 1/206* (2013.01); *G06F 1/26* (2013.01);
(Continued)

(58) Field of Classification Search
CPC . G06F 1/324; G06F 1/06; G06F 1/206; G06F 1/26; G06F 1/3212; G06F 1/3234;
(Continued)

(56) References Cited

U.S. PATENT DOCUMENTS 5,752,011 A    5/1998  Thomas et al.
7,199,783 B2   4/2007  Wenstrand et al.
(Continued)

FOREIGN PATENT DOCUMENTS

CN    1519682    8/2004
CN    101195711  1/2008
(Continued)

OTHER PUBLICATIONS

Office Action dated Jul. 29, 2022 corresponding to Chinese Patent Appln. Serial No. 201811249138.X.
(Continued)

*Primary Examiner* — Nitin C Patel
(74) *Attorney, Agent, or Firm* — F. Chau & Associates, LLC

(57) ABSTRACT

An application processor includes a main central processing device that operates based on an external main clock signal received from at least one external clock source when the application processor is in an active mode, at least one internal clock source that generates an internal clock signal, and a sensor sub-system that processes sensing-data received from at least one sensor module on a predetermined cycle when the application processor is in the active mode or a sleep mode, and that operates based on the internal clock
(Continued)

signal or an external sub clock signal received from the external clock source depending on an operating speed required for processing the sensing-data.

20 Claims, 13 Drawing Sheets

Related U.S. Application Data continuation of application No. 15/947,437, filed on Apr. 6, 2018, now Pat. No. 10,782,768, which is a continuation of application No. 15/233,371, filed on Aug. 10, 2016, now Pat. No. 9,958,930, which is a continuation of application No. 14/048,205, filed on Oct. 8, 2013, now Pat. No. 9,442,556.

(51) Int. Cl.
| | | |
|---|---|---|
| G06F 1/20 | (2006.01) | |
| G06F 1/26 | (2006.01) | |
| G06F 1/3212 | (2019.01) | |
| G06F 1/3234 | (2019.01) | |
| G06F 1/324 | (2019.01) | |
| G06F 1/3287 | (2019.01) | |

(52) U.S. Cl.
CPC .......... *G06F 1/3212* (2013.01); *G06F 1/3234* (2013.01); *G06F 1/3287* (2013.01); *Y02D 10/00* (2018.01); *Y02D 30/50* (2020.08)

(58) Field of Classification Search
CPC . G06F 1/3287; G06F 1/04; G06F 1/32; Y02D 10/00; Y02D 30/50
See application file for complete search history.

(56) References Cited

U.S. PATENT DOCUMENTS

| | | |
|---|---|---|
| 8,169,413 B2 | 5/2012 | Jin et al. |
| 8,392,735 B2 | 3/2013 | Mucignat et al. |
| 8,667,313 B2 | 3/2014 | Kim |
| 8,806,228 B2 | 8/2014 | Gee et al. |
| 8,838,857 B2 | 9/2014 | Yang |
| 9,442,556 B2 | 9/2016 | Joo et al. |
| 9,958,930 B2 | 5/2018 | Joo et al. |
| 10,782,768 B2 | 9/2020 | Joo et al. |
| 2001/0047494 A1 | 11/2001 | Thomas et al. |
| 2004/0257462 A1 | 12/2004 | Goris et al. |
| 2005/0005185 A1 | 1/2005 | Yamamoto |
| 2005/0240786 A1 | 10/2005 | Ranganathan |
| 2008/0279017 A1 | 11/2008 | Shimano et al. |
| 2009/0259865 A1 | 10/2009 | Sheynblat et al. |
| 2010/0194632 A1 | 8/2010 | Raento et al. |
| 2010/0302028 A1 | 12/2010 | Desai et al. |
| 2010/0313050 A1 | 12/2010 | Harrat et al. |
| 2010/0325194 A1 | 12/2010 | Williamson et al. |
| 2011/0234300 A1 | 9/2011 | Zhang et al. |
| 2012/0077554 A1 | 3/2012 | Ahn et al. |
| 2012/0185684 A1 | 7/2012 | Lee et al. |
| 2012/0185717 A1 | 7/2012 | Song et al. |
| 2012/0191993 A1 | 7/2012 | Drader et al. |
| 2013/0080819 A1 | 3/2013 | Bowling et al. |
| 2013/0275786 A1 | 10/2013 | Tanaka |
| 2014/0115366 A1 | 4/2014 | Joo et al. |
| 2016/0349819 A1 | 12/2016 | Joo et al. |
| 2018/0224918 A1 | 8/2018 | Joo et al. |
| 2019/0346907 A1 | 11/2019 | Kabasawa et al. |
| 2020/0387207 A1 | 12/2020 | Joo et al. |

FOREIGN PATENT DOCUMENTS

| | | |
|---|---|---|
| CN | 201252572 | 6/2009 |
| CN | 101578571 | 11/2009 |
| CN | 101802750 | 8/2010 |
| CN | 101965039 | 2/2011 |
| CN | 101978748 | 2/2011 |
| CN | 202210263 | 5/2012 |
| CN | 102566754 | 7/2012 |
| CN | 102713788 | 10/2012 |
| JP | 2011-061686 | 3/2011 |
| JP | 2012-065127 | 3/2012 |
| KR | 2003-0014933 | 2/2003 |
| KR | 1020110012494 | 2/2011 |
| KR | 1020110027987 | 3/2011 |
| KR | 1020110030274 | 3/2011 |
| KR | 1020110051897 | 5/2011 |
| KR | 1020110085513 | 7/2011 |

OTHER PUBLICATIONS

Office Action dated Jan. 6, 2022 corresponding to Chinese Patent Appln. Serial No. 201811249138.X.
Office Action dated Jun. 21, 2022 in corresponding U.S. Appl. No. 17/000,750.

APPLICATION PROCESSOR, MOBILE DEVICE HAVING THE SAME, AND METHOD OF SELECTING A CLOCK SIGNAL FOR AN APPLICATION PROCESSOR

CROSS-REFERENCE TO RELATED APPLICATION(S)

This application is a continuation of U.S. patent application Ser. No. 17/000,750 filed Aug. 24, 2020, which issued on Jan. 24, 2023 as U.S. Pat. No. 11,561,600, which is a continuation application of U.S. patent application Ser. No. 15/947,437 filed Apr. 6, 2018, which issued as U.S. Pat. No. 10,782,768 on Sep. 22, 2020, which is a continuation application of U.S. patent application Ser. No. 15/233,371 filed Aug. 10, 2016, which issued as U.S. Pat. No. 9,958,930 on May 1, 2018, which is a continuation application of U.S. patent application Ser. No. 14/048,205 filed Oct. 8, 2013, which issued as U.S. Pat. No. 9,442,556 on Sep. 13, 2016, which claims priority under 35 USC § 119 to Korean Patent Applications No. 10-2012-0116507, filed on Oct. 19, 2012 in the Korean Intellectual Property Office (KIPO), the disclosures of which are incorporated by reference in their entireties herein.

BACKGROUND

1. Technical Field

Exemplary embodiments of the inventive concept relate generally to an electronic device. More particularly, exemplary embodiments of the inventive concept relate to an application processor, a mobile device having the application processor, and a method of selecting a clock signal for the application processor.

2. Discussion of Related Art

A mobile device (e.g., a smart-phone, etc.) may include an application processor for performing operations and a battery to provide power. The mobile device may reduce unnecessary power consumption by changing an operating mode of the application processor from an active mode to a sleep mode when certain operations do not need to be performed. However, in the sleep mode of the application processor, the mobile device needs to periodically monitor its environment for external events using at least one sensor module.

The mobile device may change the operating mode of the application processor from the sleep mode to the active mode periodically to process sensing-data received from the sensor module. However, since the mobile device may be active longer than is necessary to process the sensing-data, the mobile device may consume unnecessary power.

SUMMARY

At least one exemplary embodiment of the inventive concept provides an application processor capable of efficiently processing sensing-data received from at least one sensor module when the sensor module senses external environmental events on a predetermined cycle. For example, the application processor may have an improved performance and consume less power.

In at least one exemplary embodiment of the inventive concept a mobile device includes the application processor.

At least one exemplary embodiment of the inventive concept provides a method of selecting a clock signal for the application processor, which controls the application processor to efficiently process sensing-data received from at least one sensor module when the sensor module senses external environmental events on a predetermined cycle.

According to an exemplary embodiment of the inventive concept, an application processor includes a main central processing device that operates based on an external main clock signal received from at least one external clock source when the application processor is in an active mode, at least one internal clock source that generates an internal clock signal, and a sensor sub-system that processes sensing-data received from at least one sensor module on a predetermined cycle when the application processor is in the active mode or a sleep mode, and that operates based on the internal clock signal or an external sub clock signal depending on an operating speed required for processing the sensing-data, where the external sub clock signal is received from the external clock source.

In an exemplary embodiment, a frequency of the internal clock signal is lower than a frequency of the external and main sub clock signals.

In an exemplary embodiment, the sensor sub-system includes a memory unit having at least one memory device, an external interfacing unit that communicates with the sensor module, an internal communicating unit that communicates with the main central processing device, a clock signal receiving unit that selectively receives the internal clock signal or the external sub clock signal based on the operating speed, and a central processing unit that controls the memory unit, the external interfacing unit, the internal communicating unit, and the clock signal receiving unit.

In an exemplary embodiment, the sensor sub-system receives the internal clock signal when the operating speed is less than a first threshold value, and receives the external sub clock signal when the operating speed is greater than the first threshold value.

In an exemplary embodiment, the sensor sub-system changes an operating mode of the application processor from the sleep mode to the active mode by activating the main central processing device when the operating speed is greater than a second threshold value, where the second threshold value is greater than the first threshold value.

In an exemplary embodiment of the inventive concept, the sensor sub-system includes a temperature sensing unit that generates temperature information by sensing an ambient temperature, or that receives the temperature information from another source.

In an exemplary embodiment, the sensor sub-system adjusts a wake-up time and a data-read time of the sensor module based on the temperature information.

In an exemplary embodiment, the sensor sub-system decreases the operating speed by increasing a data-processing time when the wake-up time and the data-read time decrease based on the temperature information.

In an exemplary embodiment, the sensor sub-system performs a library operation by generating processing-data based on the sensing-data to output the processing-data to the main central processing device, or performs a bypass operation by delivering the sensing-data to the main central processing device.

In an exemplary embodiment, the sensor sub-system decreases the operating speed by turning-off at least one of the sensor module when a battery is in a low battery state.

In an exemplary embodiment, the sensor sub-system decreases the operating speed by reducing the number of times the sensor module performs a sensing operation when a battery is in a low battery state.

In an exemplary embodiment, the application processor is implemented using a system on-chip.

In an exemplary embodiment, the internal clock source is an on-chip oscillator or a real-time clock.

In an exemplary embodiment, the external clock source is a phase locked loop that is coupled to an off-chip oscillator.

According to an exemplary embodiment of the inventive concept, a mobile device includes at least one function module that performs a function operation, at least one sensor module that performs a sensing operation, at least one external clock source that generates an external main clock signal and an external sub clock signal, an application processor that processes sensing-data received from the sensor module on a predetermined cycle based on an internal clock signal or the external sub clock signal when the application processor is in an active mode or a sleep mode, and a power management integrated circuit that provides a power to the function module, the sensor module, the external clock source, and the application processor.

In an exemplary embodiment, the application processor includes a main central processing device that operates based on the external main clock signal when the application processor is in the active mode, at least one internal clock source that generates the internal clock signal, and a sensor sub-system that processes the sensing-data when the application processor is in the active mode or the sleep mode, and that operates based on the internal clock signal or the external sub clock signal depending on an operating speed required for processing the sensing-data.

In an exemplary embodiment, a frequency of the internal clock signal is lower than the external main and sub clock signals.

In an exemplary embodiment, the sensor sub-system includes a memory unit having at least one memory device, an external interfacing unit that communicates with the sensor module, an internal communicating unit that communicates with the main central processing device, a clock signal receiving unit that selectively receives the internal clock signal or the external sub clock signal based on the operating speed, and a central processing unit that controls the memory unit, the external interfacing unit, the internal communicating unit, and the clock signal receiving unit.

In an exemplary embodiment, the sensor sub-system receives the internal clock signal when the operating speed is less than a first threshold value, and receives the external sub clock signal when the operating speed is greater than the first threshold value.

In an exemplary embodiment, the sensor sub-system changes an operating mode of the application processor from the sleep mode to the active mode by activating the main central processing device when the operating speed is greater than a second threshold value, where the second threshold value is greater than the first threshold value.

In an exemplary embodiment, the sensor sub-system includes a temperature sensing unit that generates temperature information by sensing an ambient temperature, or that receives the temperature information from another source.

In an exemplary embodiment, the sensor sub-system adjusts a wake-up time and a data-read time of the sensor module based on the temperature information.

In an exemplary embodiment, the sensor sub-system decreases the operating speed by increasing a data-processing time when the wake-up time and the data-read time decrease based on the temperature information.

In an exemplary embodiment, the sensor sub-system performs a library operation by generating processing-data based on the sensing-data to output the processing-data to the main central processing device, or performs a bypass operation by delivering the sensing-data to the main central processing device.

In an exemplary embodiment, the sensor sub-system decreases the operating speed by turning-off at least one of the sensor module when a battery is in a low battery state.

In an exemplary embodiment, the sensor sub-system decreases the operating speed by reducing the number of times the sensor module performs the sensing operation when a battery is in a low battery state.

According to an exemplary embodiment, a method of selecting a clock signal for an application processor, where the application processor processes sensing-data received from at least one sensor module on a predetermined cycle when the application processor is in an active mode or a sleep mode, includes controlling a sensor sub-system included in the application processor to receive the sensing-data from the sensor module, controlling the sensor sub-system to calculate an operating speed required for processing the sensing-data based on the sensing-data, and controlling the sensor sub-system to selectively receive the clock signal from an internal clock source or an external clock source based on the operating speed, where the internal clock source is located inside the application processor, and the external clock source is located outside the application processor.

In an exemplary embodiment, a frequency of the clock signal received from the internal clock source is lower than a frequency of the clock signal received from the external clock source.

According to an exemplary embodiment of the inventive concept, an application processor includes a main central processing device configured to operate using a first clock signal and a second sub-system configured to process sensing data received from a sensor module using a second clock signal. The sensor sub-system is configured to determine an operating speed required to process the received sensing data. The sensor sub-system deactivates the main central processing device when the determined operating speed is less than a threshold and otherwise activates the main central processing device to assist in processing the sensing data. A frequency of the first clock signal is higher than a frequency of the second clock signal.

In an exemplary embodiment, the application processor further includes an internal clock source located within the application processor that provides the second clock signal, where the first clock signal is provided to the main central processing device located outside the application processor.

An application processor according to at least one exemplary embodiment may include a sensor sub-system and at least one internal clock source (e.g., an on-chip oscillator, a real-time clock, etc.), and may control the sensor sub-system to process sensing-data received from at least one sensor module when the sensor module senses external environmental events on a predetermined cycle.

In addition, a mobile device having the application processor according to at least one exemplary embodiment may efficiently monitor external environmental events.

Furthermore, a method of selecting a clock signal for the application processor according to at least one exemplary embodiment may control a sensor sub-system of the application processor to process sensing-data received from at least one sensor module when the sensor module senses external environmental events on a predetermined cycle.

BRIEF DESCRIPTION OF THE DRAWINGS

Exemplary embodiments of the inventive concept will be more clearly understood from the following detailed description taken in conjunction with the accompanying drawings.

DETAILED DESCRIPTION

Figure 1:
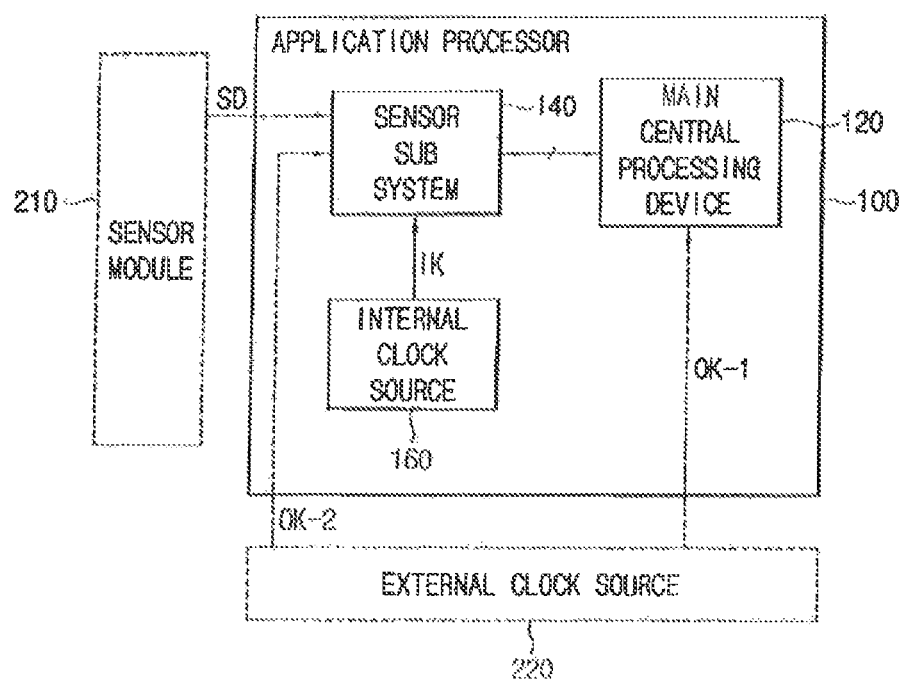
FIG. 1 is a block diagram illustrating an application processor according to an exemplary embodiment of the inventive concept.

The inventive concept will be described more fully hereinafter with reference to the accompanying drawings, in which exemplary embodiments thereof are shown. The present inventive concept may, however, be embodied in many different forms and should not be construed as limited to the exemplary embodiments set forth herein. In the drawings, the sizes and relative sizes of layers and regions may be exaggerated for clarity. Like numerals refer to like elements throughout.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise.

The methods of the inventive concept described below can be embodied as computer readable codes on a computer readable recording medium. The medium is any data storage device that can store data which can be thereafter read by a computer system. For example, the medium may include program storage device such as a hard disk, magnetic floppy disk, RAM, ROM, CD ROM, etc., and be executable by and device or machine comprising suitable architecture, such as a general purpose digital computer having a processor, memory, and input/output interfaces.

Figure 2:
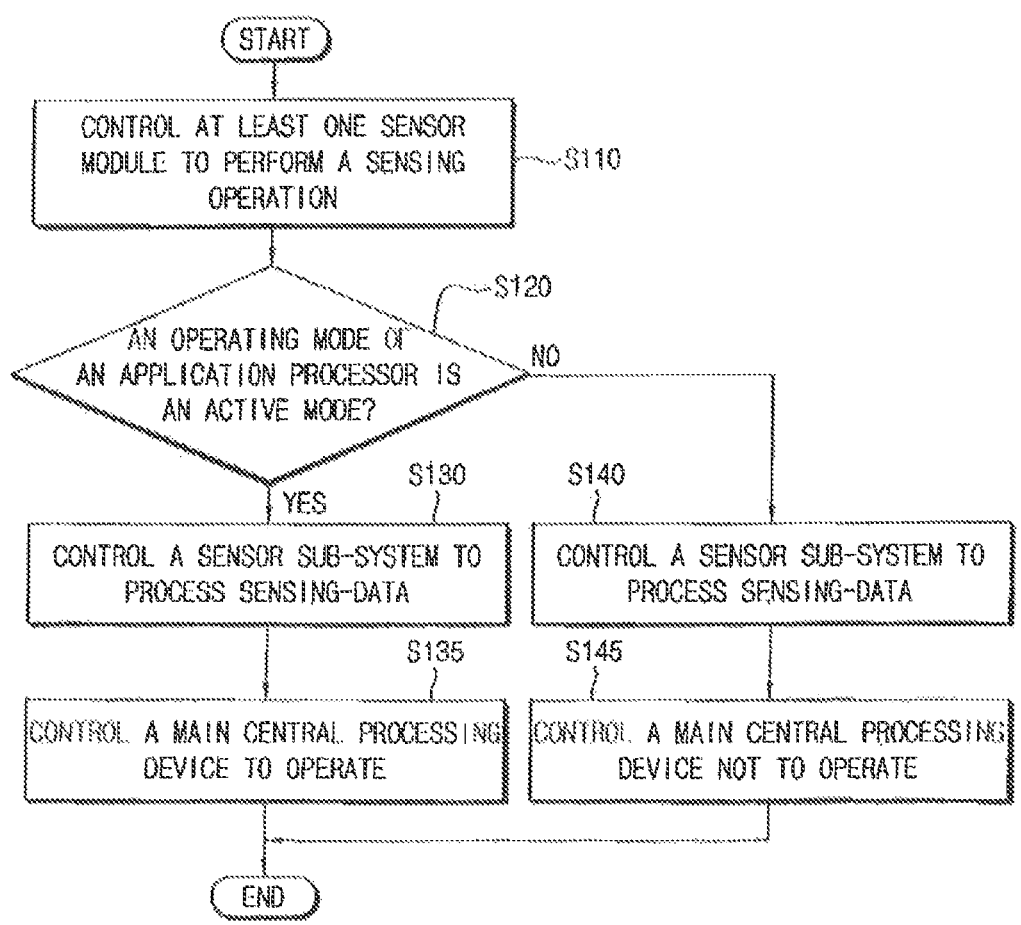
FIG. 2 is a flow chart illustrating a method of operating a main central processing device and a sensor sub-system in an application processor of FIG. 1 according to an exemplary embodiment of the inventive concept.

FIG. 1 is a block diagram illustrating an application processor according to an exemplary embodiment of the inventive concept. FIG. 2 is a flow chart illustrating a method of operating a main central processing device and a sensor sub-system operate in an application processor of FIG. 1 according to an exemplary embodiment of the inventive concept.

Referring to FIGS. 1 and 2, the application processor 100 includes a main central processing device 120, a sensor sub-system 140, and at least one internal clock source 160. In an exemplary embodiment, the application processor 100 is implemented using a system on-chip (SOC).

The main central processing device 120 operates based on an external main clock signal OK-1 received from at least one external clock source 220 when the application processor 100 is in an active mode. For example, in the active mode of the application processor 100, when the sensor sub-system 140 processes sensing-data SD received from at least one sensor module 210, the main central processing device 120 may perform a specific operation using an output of the sensor sub-system 140. The main central processing device 120 does not perform operations when the application processor 100 is in a sleep mode. In the active mode or the sleep mode of the application processor 100, the sensor sub-system 140 processes the sensing-data SD received from the sensor module 210 on a predetermined cycle. For example, if the duration of one cycle is 100 ms, and the duty cycle ratio is 50%, every 100 ms, for 50 ms, the sensor sub-system 140 processes the sensing-data SD. However, embodiments of the inventive concept are not limited to any particular duty cycle ratio or cycle durations. The sensor sub-system 140 operates based on an external sub clock signal OK-2 received from the external clock source 220 or an internal clock signal IK received from the internal clock source 160. For convenience of description, FIG. 1 shows one sensor module 210. However, the inventive concept is not limited thereto, as additional sensor modules 210 may be present. In an exemplary embodiment, a frequency of the external main clock signal OK-1 is different from a frequency of the external sub clock signal OK-2. In an exemplary embodiment, a frequency of the external main clock signal OK-1 for operating the main central processing device 120 is higher than a frequency of the external sub clock signal OK-2 for operating the sensor sub-system 140. In an exemplary embodiment, the external clock source 220 is implemented as a phase locked loop that is coupled to an off-chip oscillator. For example, the external main clock signal OK-1 and the external sub clock signal OK-2 may be clock signals that are generated based on a reference signal output by the phase locked loop, where the reference signal is output from the off-chip oscillator. Although it is illustrated in FIG. 1 that one external clock source 220 outputs the external main clock signal OK-1 and the external sub clock signal OK-2, a plurality of external clock sources 220 may be present. For example, a first external clock source 200 may be present that outputs the external main clock signal OK-1 and a second other external clock source 200 may be present that outputs the external sub clock signal OK-2.

The sensing-data SD is processed by the sensor sub-system 140, and based on an operating mode of the application processor 100 it is determined whether the main central processing device 120 operates. FIG. 2 illustrates a method of controlling the application processor 100. As illustrated in FIG. 2, the method includes controlling at least one sensor module (e.g., one or more sensor module 210) to perform a sensing operation (S110). The sensing operation generates sensing-data SD. The sensor module (e.g., 210) is located outside the application processor 100. The method includes determining (e.g., by the application processor 100) whether an operating mode of an application processor (e.g., 100) is set to the active mode (S120). If an operating mode of the application processor 100 is set to the active mode, the method includes controlling a sensor sub-system (e.g., 140) to process the sensing-data SD (S130), and controlling a main central processing device (e.g., 120) to operate (S135). On the other hand, if the operating mode of the application processor (e.g., 100) is not set to the active mode (e.g., if an operating mode of the application processor 100 is set to the sleep mode), the method includes controlling the sensor sub-system (e.g., 140) to process the sensing-data SD (S140), and controlling the main central processing device (e.g., 120) so that it does not operate (S145). When the main central processing device 120 is controlled to operate, the main central processing device may be enabled, or sent a signal indicating that it has permission to perform an operation. When the main central processing device 120 is controlled so that it does not operate, the main central processing device 120 may be disabled, or sent a signal indicating that it should not perform any operations. In an exemplary embodiment, the sensor sub system 140 is configured to enable/disable the main central processing device 120. For example, the sensor sub system 140 can send activating/deactivating signals to the main central processing device 120.

In an exemplary embodiment, the sensing-data SD is selectively processed by the main central processing device 120 or the sensor sub-system 140 based on the operating mode of the application processor 100. For example, the main central processing device 120 processes the sensing-data SD when the application processor 100 is set to the active mode, and the sensor sub-system 140 processes the sensing-data SD when the application processor 100 is set to the sleep mode. As described above, the internal clock source 160 may generate the internal clock signal IK for operating the sensor sub-system 140. For convenience of description, FIG. 1 shows one internal clock source 160. However, the inventive concept is not limited thereto, as additional internal clock sources may be present. For example, when the application processor 100 includes a plurality of internal clock sources 160, respective internal clock sources 160 may generate respective internal clock signals IK having different frequencies. In an exemplary embodiment, the internal clock source 160 is implemented as an on-chip oscillator or a real-time clock. In an exemplary embodiment, a frequency of the internal clock signal IK that is generated by the internal clock source 160 is lower than a frequency generated by the external main clock signal OK-1 and a frequency generated by the external sub clock signal OK-2, where the external main clock signal OK-1 and the external sub clock signal OK-2 are generated by the external clock source 220.

When the application processor 100 controls operations of at least one function module included in a mobile device (e.g., a smart-phone, etc), the application processor 100 needs to operate at relatively high speed (e.g., have a relatively high performance level). In other words, the main central processing device 120 included in the application processor 100 may need to operate based on a clock signal having a relatively high frequency. Thus, a clock signal having a relatively low frequency that is generated by an on-chip oscillator, a real-time clock, etc. may not be sufficient to drive or support the main central processing device 120 included in the application processor 100. Thus, past application processors do not include an internal clock source (e.g., an on-chip oscillator, etc.) because jitter characteristics of the internal clock source are not good. The application processor 100 may control the sensor sub-system 140 (e.g., rather than the main central processing device 120) to process the sensing-data SD received from the sensor module 210 on a predetermined cycle. In an exemplary embodiment, the application processor 100 controls the sensor sub-system 140 to use the internal clock signal IK received from the internal clock source 160 included in the application processor 100 when an operating speed required for processing the sensing-data SD is relatively low, and controls the sensor sub-system 140 to use the external sub clock signal OK-2 received from the external clock source 220 located outside the application processor 100 when an operating speed required for processing the sensing-data SD is relatively high. As a result, the application processor 100 may efficiently process the sensing-data SD (e.g., may satisfy requirements for a performance level improvement and a power consumption reduction). Hereinafter, an exemplary operation of the sensor sub-system 140 will be described in detail.

In the active mode or the sleep mode of the application processor 100, the sensor sub-system 140 is configured to process the sensing-data SD received from the sensor module 210 on a predetermined cycle. Depending on an operating speed required for processing the sensing-data SD, the sensor sub-system 140 operates based on the internal clock signal IK received from the internal clock source 160, or the external sub clock signal OK-2 received from the external clock source 220. When a plurality of internal clock sources 160 are present in the application processor 100, one of the internal clock sources 160 is selected based on an operating speed required for processing the sensing-data SD when the sensor sub-system 140 operates based on the internal clock signal IK (e.g., an operating speed required for processing the sensing-data SD is relatively low). In an exemplary embodiment, the sensor sub-system 140 receives the internal clock signal IK from the internal clock source 160 when an operating speed required for processing the sensing-data SD is lower than a first threshold value. On the other hand, the sensor sub-system 140 receives the external sub clock signal OK-2 from the external clock source 220 when an operating speed required for processing the sensing-data SD is greater than the first threshold value. That is, the sensor sub-system 140 selectively receives the internal clock signal IK or the external sub clock signal OK-2 based on an operating speed required for processing the sensing-data SD. Here, the first threshold value may be variously set according to requirements of the sensor sub-system 140. In addition, the first threshold value may correspond to a reference value, where a clock signal input to the sensor sub-system 140 is changed with respect to the reference value. Further, the first threshold value may be stored in a specific storage device (e.g., a look-up table, a register, etc.). For example, the storage device may be located within the application processor 100. In an exemplary embodiment, the first threshold value is a predetermined static value. In an exemplary embodiment, the first threshold value is a dynamic (changeable) value that is determined based on a result (e.g., repetition learning result) generated by a user scenario. For example, since a relatively low performance level is required when the sensor sub-system 140 receives the sensing-data SD from the sensor module 210, an operating speed required for processing the sensing-data SD may be lower than the first threshold value. As a result, the sensor sub-system 140 may operate based on the internal clock signal IK received from the internal clock source 160. On the other hand, since a relatively high performance level is required when the sensor sub-system 140 processes the sensing-data SD received from the sensor module 210, an operating speed required for processing the sensing-data SD may be greater than the first threshold value. As a result, the sensor sub-system 140 may operate based on the external sub clock signal OK-2 received from the external clock source 220.

In an exemplary embodiment, the sensor sub-system 140 activates the main central processing device 120 when an operating speed required for processing the sensing-data SD is greater than a second threshold value, where the second threshold value is greater than the first threshold value. For example, when an operating speed required for processing the sensing-data SD is higher than a processing level of the sensor sub-system 140, the main central processing device 120 assists the sensor sub-system 140 in processing the sensing-data SD. Thus, the sensor sub-system 140 may activate the main central processing device 120 when an operating speed required for processing the sensing-data SD is greater than the second threshold value. As a result, an operating mode of the application processor 100 is changed from the sleep mode to the active mode. Therefore, the main central processing device 120 operates based on the external main clock signal OK-1 received from the external clock source 220. In at least one exemplary embodiment, the sensor sub-system 140 activates the main central processing device 120 to change an operating mode of the application processor 100 from the sleep mode to the active mode when the sensing-data SD received from the sensor module 210 is excessive as compared to a processing level of the sensor sub-system 140 (e.g., a quantity of the sensing-data SD received from the sensor module 210 is greater than a quantity of the sensing-data SD that the sensor sub-system 140 can process). The second threshold value may be variously set according to requirements of the sensor sub-system 140. In addition, the second threshold value may correspond to a reference value, where an operating mode of the application processor 100 is changed with respect to the reference value. Further, the second threshold value may be stored in a specific storage device (e.g., a look-up table, register, etc.). In an exemplary embodiment, the second threshold value is a predetermined static value. In an exemplary embodiment, the second threshold value is a dynamic value that is determined based on a result (e.g., repetition learning result) generated by a user scenario. As described above, the sensor sub-system 140 may control the main central processing device 120 to assist the sensor sub-system 140 in processing the sensing-data SD by changing an operating mode of the application processor 100 from the sleep mode to the active mode when an operating speed required for processing the sensing-data SD is higher than a processing level of the sensor sub-system 140. In the active mode or the sleep mode of the application processor 100, the sensor sub-system 140 may receive the sensing-data SD from the sensor module 210 on a predetermined cycle, and may provide specific data (e.g., the sensing-data SD or processing-data that is generated by processing the sensing-data SD) to the main central processing device 120. That is, the sensor sub-system 140 may perform a library operation or a bypass operation. The library operation and the bypass operation will be described later in detail with reference to FIGS. 14 through 17.

Figure 3:
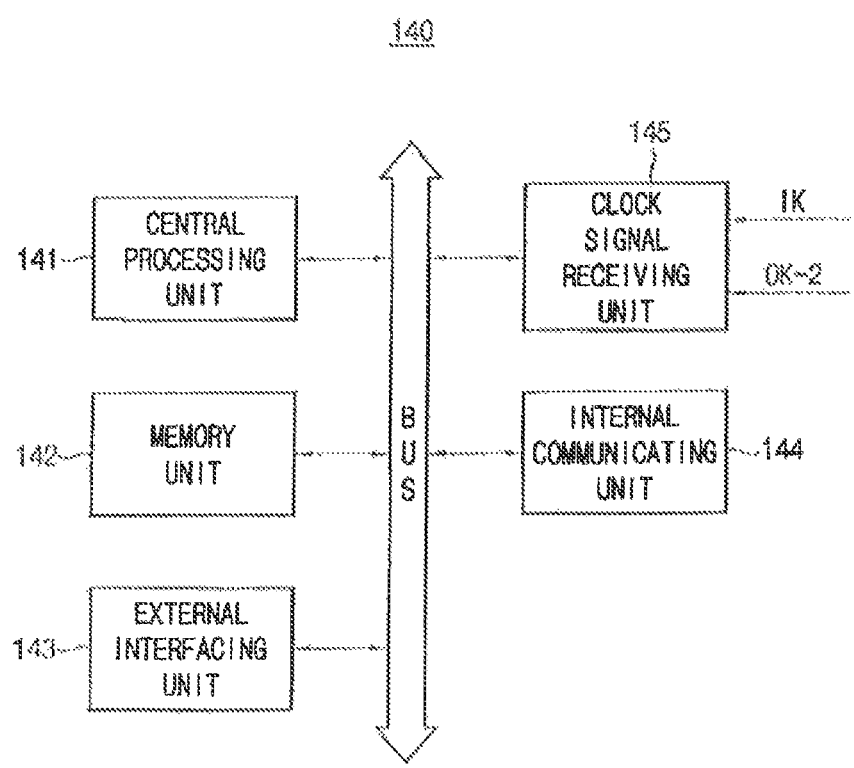
FIG. 3 is a block diagram illustrating a sensor sub-system included in an application processor of FIG. 1 according to an exemplary embodiment of the inventive concept.

FIG. 3 is a block diagram illustrating a sensor sub-system included in an application processor of FIG. 1 according to an exemplary embodiment of the inventive concept.

Referring to FIG. 3, the sensor sub-system 140 includes a central processing unit 141, a memory unit 142, an external interfacing unit 143, an internal communicating unit 144, and a clock signal receiving unit 145.

The central processing unit 141 may control an overall operation of the sensor sub-system 140. For example, the central processing unit 141 may control the memory unit 142, the external interfacing unit 143, the internal communicating unit 144, and the clock signal receiving unit 145. The memory unit 142 may include at least one memory device. The memory unit 142 may act as a buffer that temporarily stores the sensing-data SD received from at least one sensor module 210, and thus may store internal codes, internal data, etc. for the sensor sub-system 140. In an exemplary embodiment, the memory unit 142 includes a volatile memory device such as a dynamic random access memory (DRAM) device, a static random access memory (SRAM) device, a mobile DRAM device, etc., and a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The external interfacing unit 143 may receive the sensing-data SD from the sensor module 210.

The internal communicating unit 144 may control the sensor sub-system 140 to communicate with the main central processing device 120 of the application processor 100. For example, the internal communicating unit 144 may enable a bidirectional communication between the sensor sub-system 140 and the main central processing device 120 by performing a setting operation (e.g., SET) and a clearing operation (e.g., CLEAR) on specific registers.

Depending on an operating speed required for processing the sensing-data SD received from the sensor module 210 on a predetermined cycle, the clock signal receiving unit 145 may receive the internal clock signal IK from at least one internal clock source 160, or may receive the external sub clock signal OK-2 from at least one external clock source 220. In other words, based on an operating speed required for processing the sensing-data SD, a clock signal for operating the sensor sub-system 140 may be selected as the internal clock signal IK or the external sub clock signal OK-2. Although it is illustrated in FIG. 3 that the clock signal receiving unit 145 receives one of the internal clock signal IK and the external sub clock signal OK-2, the clock signal receiving unit 145 may receive one of a plurality of internal clock signals IK and a plurality of external sub clock signals OK-2. As described above, the internal clock source 160 may be implemented as an on-chip oscillator or a real-time clock, and the external clock source 220 may be implemented as a phase locked loop that is coupled to an off-chip oscillator. Thus, the sensor sub-system 140 may operate based on the external sub clock signal OK-2 received from the external clock source 220 when a relatively high performance level is required, and may operate based on the internal clock signal IK received from the internal clock source 160 when a relatively low performance level is required.

The application processor 100 includes the sensor sub-system 140 and the internal clock source 160, and may control the sensor sub-system 140 to process the sensing-data SD received from the sensor module 210 when the sensor module 210 senses external environmental events on a predetermined cycle in the active mode or the sleep mode of the application processor 100. Since the sensor sub-system 140 selectively receives a clock signal from the internal clock source 160 or the external clock source 220 based on an operating speed required for processing the sensing-data SD, the application processor 100 may efficiently process the sensing-data SD (e.g., may satisfy requirements for improved performance level and a power consumption reduction). When an operating speed required for processing the sensing-data SD is excessive as compared to the external sub clock signal OK-2 that is received from the external clock source 220 as well as the internal clock signal IK that is received from the internal clock source 160, the sensor sub-system 140 may activate the main central processing device 120 using the internal communicating unit 144. When this occurs, an operating mode of the application processor 100 is changed from the sleep mode to the active mode. Thus, the main central processing device 120 of the application processor 100 may assist the sensor sub-system 140 in processing the sensing-data SD based on the external main clock signal OK-1 received from the external clock source 220. In an exemplary embodiment, after the main central processing device 120 is activated, an operating mode of the application processor 100 is changed from the active mode to the sleep mode to reduce unnecessary power consumption when an operating speed required for processing the sensing-data SD decreases.

Figure 4:
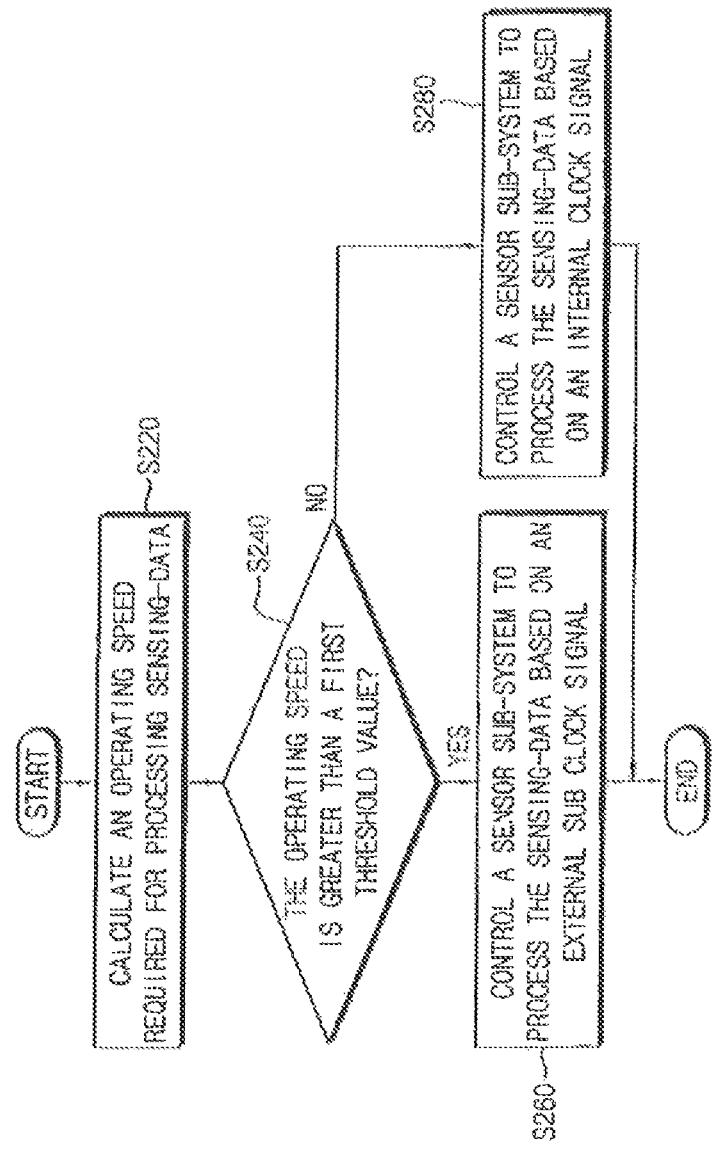
FIG. 4 is a flow chart illustrating a method of selecting a clock signal for a sensor sub-system of FIG. 3 according to an exemplary embodiment of the inventive concept.
Figure 5:
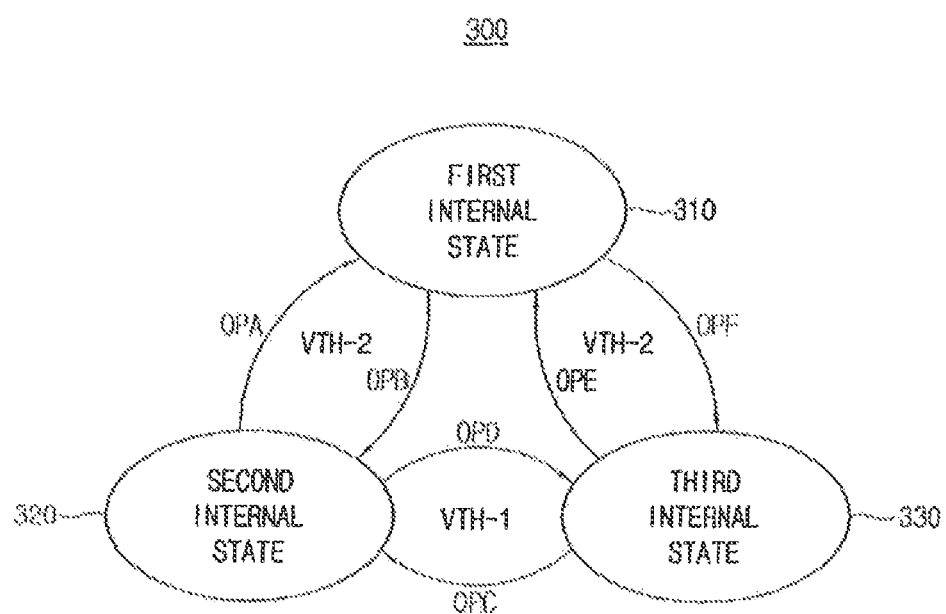
FIG. 5 is a concept diagram illustrating an example in which a clock signal is selected for a sensor sub-system of FIG. 3.

FIG. 4 is a flow chart illustrating a method of selecting a clock signal for a sensor sub-system of FIG. 3 according to an exemplary embodiment of the inventive concept. FIG. 5 is a concept diagram illustrating an example in which a clock signal is selected for a sensor sub-system of FIG. 3.

Referring to FIGS. 4 and 5, the method includes calculating (e.g., sensor sub-system 140) an operating speed required for processing the sensing-data SD received from at least one sensor module 210 (S220), and determining (e.g., by 140) whether an operating speed required for processing the sensing-data SD is greater than a first threshold value VTH-1 (S240). When the operating speed required for processing the sensing-data SD is greater than the first threshold value VTH-1, the method includes controlling a sensor sub-system (e.g., 140) to process the sensing-data SD based on an external sub clock signal (e.g., OK-2) received from at least one external clock source (e.g., 220) (S260). On the other hand, when the operating speed required for processing the sensing-data SD is less than the first threshold value VTH-1, the method includes controlling the sensor sub-system (e.g., 140) to process the sensing-data SD based on an internal clock signal IK received from at least one internal clock source (e.g., 160) (S280). As described above, the first threshold value VTH-1 may be variously set according to requirements of the sensor sub-system 140. In addition, the first threshold value VTH-1 may correspond to a reference value, where a clock signal input to the sensor sub-system 140 is changed with respect to the reference value.

As illustrated in FIG. 5, in an active mode or a sleep mode of the application processor 100, the application processor 100 controls the sensor sub-system 140 to process the sensing-data SD based on the internal clock signal IK received from the internal clock source 160, or the external sub clock signal OK-2 received from the external clock source 220. In FIG. 5, a first internal state 310 corresponds to the active mode of the application processor 100, and a second internal state 320 and a third internal state 330 correspond to the sleep mode of the application processor 100. That is, the first internal state 310 indicates a state in which the sensor sub-system 140 processes the sensing-data SD based on the internal clock signal IK or the external sub clock signal OK-2, and the main central processing device 120 performs a specific operation based on an external main clock signal OK-1. In addition, the second internal state 320 indicates a state in which the sensor sub-system 140 processes the sensing-data SD based on the internal clock signal IK, but the main central processing device 120 does not operate. Further, the third internal state 330 indicates a state in which the sensor sub-system 140 processes the sensing-data SD based on the external sub clock signal OK-2, but the main central processing device 120 does not operate.

While the application processor 100 operates in the first internal state 310, an operating speed required for processing the sensing-data SD may become less than a second threshold value VTH-2. When this occurs, an internal state of the application processor 100 is changed to the second internal state 320 or the third internal state 330 (e.g., indicated as OPB and OPF). As described above, the second threshold value VTH-2 may be variously set based on required conditions for the sensor sub-system 140. The second threshold value VTH-2 may correspond to a reference value, where an operating mode of the application processor 100 is changed with respect to the reference value. In addition, while the application processor 100 operates in the second internal state 320, an operating speed required for processing the sensing-data SD may become greater than the first threshold value VTH-1. When this occurs, an internal state of the application processor 100 is changed to the third internal state 330 (e.g., indicated as OPD) because the sensor sub-system 140 needs to process the sensing-data SD based on the external sub clock signal OK-2 when an operating speed required for processing the sensing-data SD becomes greater than the first threshold value VTH-1. On the other hand, while the application processor 100 operates in the third internal state 330, an operating speed required for processing the sensing-data SD may become less than the first threshold value VTH-1. When this occurs, an internal state of the application processor 100 is changed to the second internal state 320 (e.g., indicated as OPC) because the sensor sub-system 140 needs to process the sensing-data SD based on the internal clock signal IK when an operating speed required for processing the sensing-data SD becomes less than the first threshold value VTH-1. Further, while the application processor 100 operates in the second internal state 320 or the third internal state 330, an operating speed required for processing the sensing-data SD may become greater than the second threshold value VTH-2. When this occurs, an operating mode of the application processor 100 is changed from the sleep mode to the active mode. Thus, an internal state of the application processor 100 is changed to the first internal state 310 (e.g., indicated as OPA and OPE). As described above, the first and second threshold values VTH-1 and VTH-2 may be variously set according to requirements of the sensor sub-system 140. For example, the first threshold value VTH-1 may have a value between an operating speed required for receiving the sensing-data SD and an operating speed required for processing the sensing-data SD. In addition, the second threshold value VTH-2 may have a value corresponding to a maximum operating speed of the sensor sub-system 140 for processing the sensing-data SD. However, the present inventive concept is not limited thereto.

Figure 6:
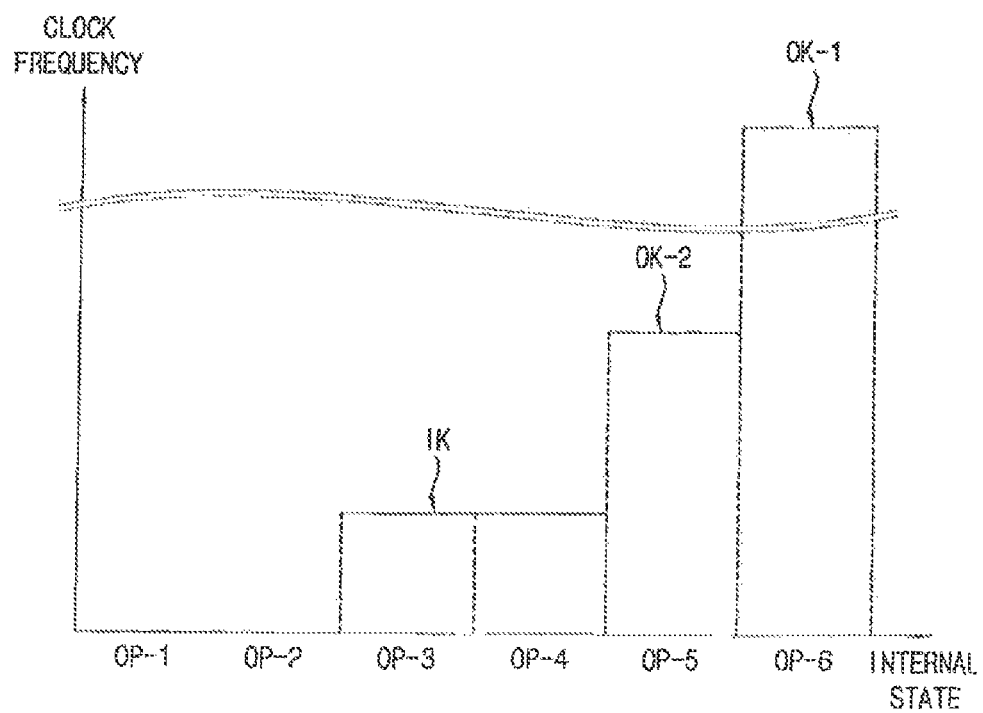
FIG. 6 is a diagram illustrating an exemplary clock signal that is selected based on an internal state of an application processor of FIG. 1.
Figure 7:
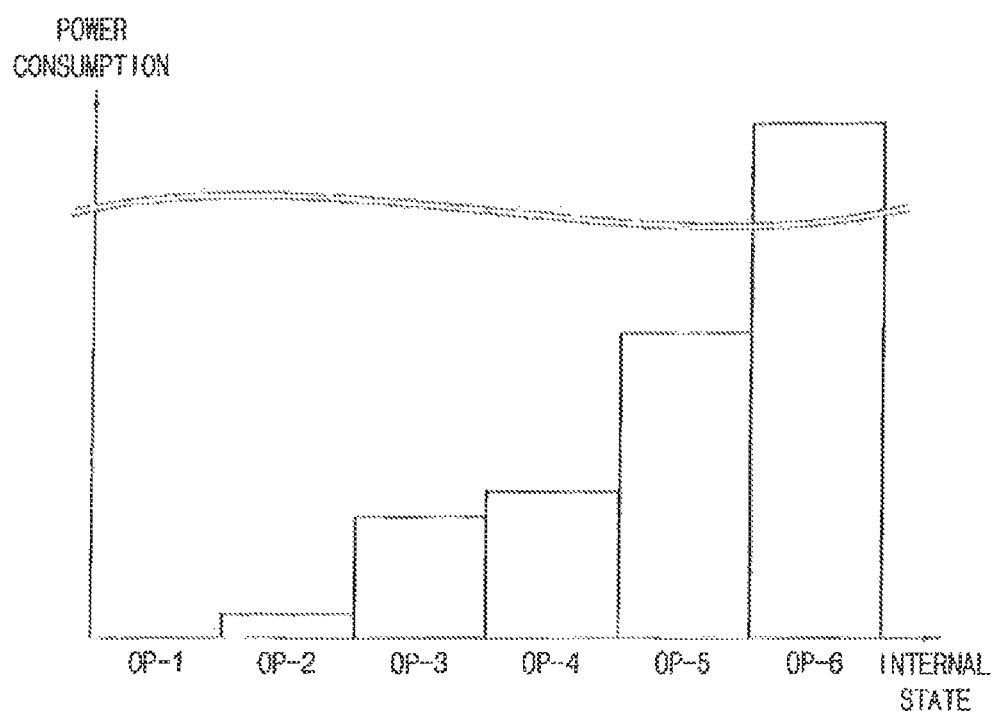
FIG. 7 is a diagram illustrating an exemplary amount of power that is consumed based on an internal state of an application processor of FIG. 1.

FIG. 6 is a diagram illustrating a clock signal that is selected based on an internal state of an application processor of FIG. 1. FIG. 7 is a diagram illustrating power that is consumed based on an internal state of an application processor of FIG. 1.

Referring to FIGS. 6 and 7, an internal state of the application processor 100 is illustrated in detail. Here, first through fifth internal states OP-1 through OP-5 correspond to a sleep mode of the application processor 100, and a sixth internal state OP-6 corresponds to an active mode of the application processor 100. The first internal state OP-1 indicates a state in which an internal clock source 160 that generates an internal clock signal IK is in a power-off state, and an external clock source 220 that generates an external sub clock signal OK-2 is in a power-off state. That is, the sensor sub-system 140 does not receive the internal clock signal IK from the internal clock source 160, and does not receive the external sub clock signal OK-2 from the external clock source 220 in the first internal state OP-1. Here, since an operating mode of the application processor 100 is a sleep mode, the external clock source 220 that generates the external main clock signal OK-1 may be also in a power-off state. As a result, no power consumption occurs in the first internal state OP-1. The second internal state OP-2 indicates a state in which the internal clock source 160 that generates the internal clock signal IK is in a power-off state, and the external clock source 220 that generates the external sub clock signal OK-2 is in a transition-to-ready state. Since the external clock source 220 generates the external sub clock signal OK-2 having a relatively high frequency, the external clock source 220 needs time to become stabilized (e.g., to be ready for generating the external sub clock signal OK-2). As a result, power consumption for stabilizing the external clock source 220 that generates the external sub clock signal OK-2 occurs in the second internal state OP-2. However, the sensor sub-system 140 may not receive the internal clock signal IK from the internal clock source 160, and may not receive the external sub clock signal OK-2 from the external clock source 220 in the second internal state OP-2.

The third internal state OP-3 indicates a state in which the internal clock source 160 that generates the internal clock signal IK is in a power-on state, and the external clock source 220 that generates the external sub clock signal OK-2 is in a power-off state. That is, the sensor sub-system 140 receives the internal clock signal IK from the internal clock source 160. As a result, power consumption for operating the internal clock source 160 occurs in the third internal state OP-3. Here, since an operating mode of the application processor 100 is the sleep mode, the external clock source 220 that generates the external main clock signal OK-1 may be in a power-off state. The fourth internal state OP-4 indicates a state in which the internal clock source 160 that generates the internal clock signal IK is in a power-off state, and the external clock source 220 that generates the external sub clock signal OK-2 is in a transition-to-ready state. That is, the sensor sub-system 140 controls the external clock source 220 that generates the external sub clock signal OK-2 to be ready while receiving the internal clock signal IK from the internal clock source 160. As a result, power consumption for operating the internal clock source 160 occurs, and power consumption for stabilizing the external clock source 220 that generates the external sub clock signal OK-2 occurs in the fourth internal state OP-4. The fifth internal state OP-5 indicates a state in which the internal clock source 160 that generates the internal clock signal IK is in a power-off state, and the external clock source 220 that generates the external sub clock signal OK-2 is in a power-on state. That is, the sensor sub-system 140 receives the external sub clock signal OK-2 from the external clock source 220. As a result, power consumption for operating the external clock source 220 that generates the external sub clock signal OK-2 occurs in the fifth internal state OP-5.

The sixth internal state OP-6 indicates a state in which the main central processing device 120 performs a specific operation based on the external main clock signal OK-1 received from the external clock source 220, and the sensor sub-system 140 processes the sensing-data SD based on the internal clock signal IK or the external sub clock signal OK-2. As a result, since the external clock source 200 that generates the external main clock signal OK-1 is in a power-on state, more power consumption may occur in the sixth internal state OP-6 as compared to the sleep mode of the application processor 100. Thus, the sensor sub-system 140 may select a clock signal based on an internal state of the application processor 100, and thus may consume an optimized power reflecting the internal state of the application processor 100. Although it is illustrated in FIGS. 6 and 7 that the first through sixth internal states OP-1 through OP-6 are sequentially arranged, a sequence of the first through sixth internal states OP-1 through OP-6 is not limited thereto. For example, an internal state of the application processor 100 may be one of the first through sixth internal states OP-1 through OP-6 based on an operating speed required for processing the sensing-data SD. As described above, since the sensor sub-system 140 selectively receives a clock signal from the internal clock source 160 or the external clock source 220 based on an operating speed required for processing the sensing-data SD received from at least one sensor module 210, the sensing-data SD may be efficiently processed (e.g., requirements for a performance level improvement and a power consumption reduction may be satisfied). In addition, when the sensor sub-system 100 has difficulties processing the sensing-data SD (e.g., when an operating speed required for processing the sensing-data SD is higher than a processing level of the sensor sub-system 140), the sensor sub-system 140 may control the main central processing device 120 of the application processor 100 to assist the sensor sub-system 140 in processing the sensing-data SD by changing an operating mode of the application processor 100 from the sleep mode to the active mode based on an operating speed required for processing the sensing-data SD. As a result, the application processor 100 may achieve a high operational stability (or, reliability).

Figure 8:
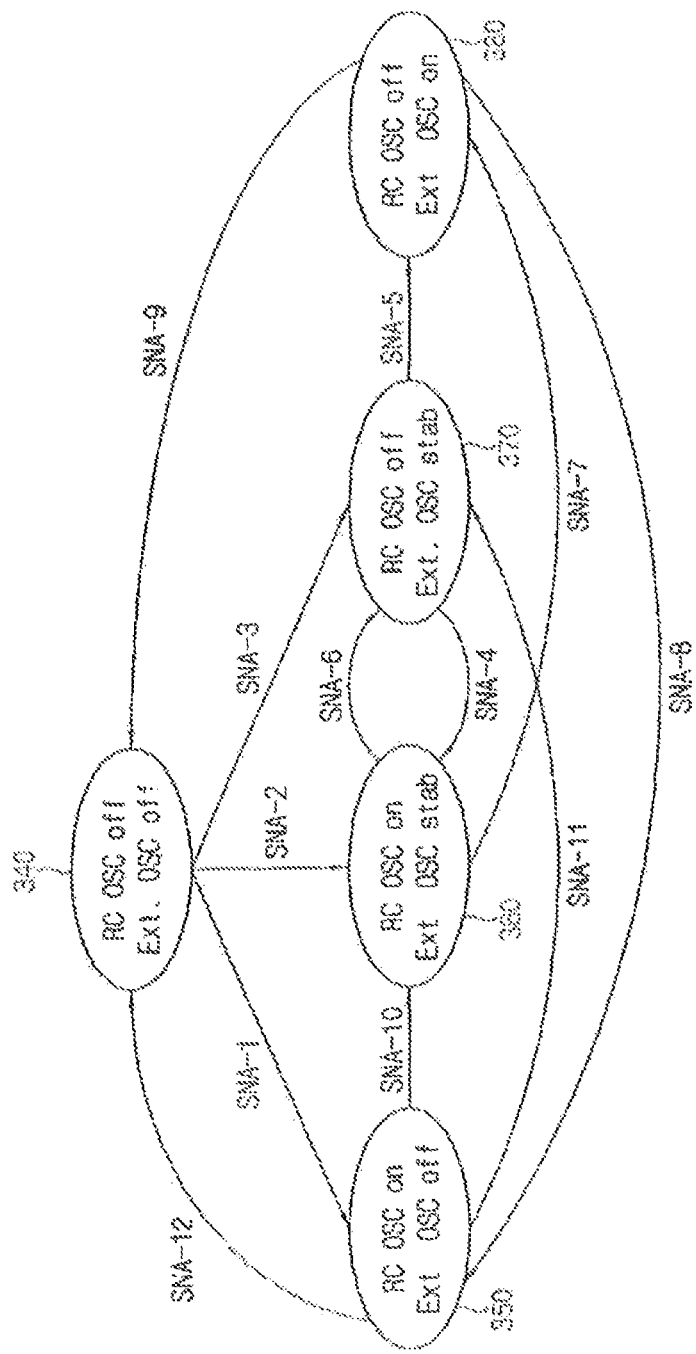
FIG. 8 is a diagram illustrating an exemplary scenario in which a clock signal is selected based on an internal state of an application processor of FIG. 1 by a sensor sub-system of FIG. 3.

FIG. 8 is a diagram illustrating an exemplary scenario in which a clock signal is selected based on an internal state of an application processor of FIG. 1 by a sensor sub-system of FIG. 3.

Referring to FIG. 8, it is assumed that the sensor sub-system 140 requires an operating speed that is lower than 50 Dhrystone (DMIPS) when receiving (e.g., reading) the sensing-data SD from at least one sensor module 210, the sensor sub-system 140 requires an operating speed that is higher than 50 DMIPS when processing the sensing-data SD, and an internal clock signal IK received from at least one internal clock source 160 (e.g., an on-chip oscillator, a real-time clock, etc.) cannot support an operating speed that is higher than 50 DMIPS. Thus, the sensor sub-system 140 operates based on the internal clock signal IK received from the internal clock source 160 when receiving the sensing-data SD, and operates based on an external sub clock signal OK-2 received from at least one external clock source 220 (e.g., a phase locked loop coupled to an off-chip oscillator, etc) when processing the sensing-data SD.

For example, when the application processor 100 is in an idle state (e.g., a first internal state 340), the internal clock source 160 that generates the internal clock signal IK is in a power-off state, and the external clock source 220 that generates the external sub clock signal OK-2 is in a power-off state. When receiving the sensing-data SD is required (e.g., when an operating speed that is lower than 50 DMIPS is required), the internal clock source 160 that generates the internal clock signal IK is turned-on (e.g., indicated as SNA-1). In the first internal state 340 of the application processor 100, when receiving the sensing-data SD is required and it is predicted that a processing of the sensing-data SD is needed (e.g., when it is predicted that an operating speed that is higher than 50 DMIPS is needed), the internal clock source 160 that generates the internal clock signal IK is turned-on, and the external clock source 220 that generates the external sub clock signal OK-2 is prepared (e.g., indicated as SNA-2). In the first internal state 340 of the application processor 100, when receiving the sensing-data SD is not required, but it is predicted that the processing of the sensing-data SD is needed, the external clock source 220 that generates the external sub clock signal OK-2 is prepared (e.g., indicated as SNA-3). In an embodiment, it may be predicted that processing of the sensing-data SD is needed when a buffer storing the data has filled up beyond a predetermined fill threshold. In a fourth internal state 370 of the application processor 100, when receiving the sensing-data SD is required, the internal clock source 160 that generates the internal clock signal IK may be turned-on (i.e., indicated as SNA-4). In the fourth internal state 370 of the application processor 100, when processing the sensing-data SD is required, the external clock source 220 that generates the external sub clock signal OK-2 is turned-on (e.g., indicated as SNA-5) because the external clock source 220 that generates the external sub clock signal OK-2 is prepared. In a third internal state 360 of the application processor 100, when receiving the sensing-data SD is not required, the internal clock source 160 that generates the internal clock signal IK is turned-off (e.g., indicated as SNA-6). In the third internal state 360 of the application processor 100, when receiving the sensing-data SD is not required, but processing the sensing-data SD is required, the internal clock source 160 that generates the internal clock signal IK is turned-off, and the external clock source 220 that generates the external sub clock signal OK-2 is turned-on (e.g., indicated as SNA-7) because the external clock source 220 that generates the external sub clock signal OK-2 is prepared. Please note that use of 50 DMIPS above is an example of one threshold that can be used, and the inventive concept is not limited thereto.

In a fifth internal state 380 of the application processor 100, when processing the sensing-data SD is not required, but receiving the sensing-data SD is required, the internal clock source 160 that generates the internal clock signal IK is turned-on, and the external clock source 220 that generates the external sub clock signal OK-2 is turned-off (e.g., indicated as SNA-8). In the fifth internal state 380 of the application processor 100, when processing the sensing-data SD is not required, and it is predicted that a processing of the sensing-data SD is not needed, the external clock source 220 that generates the external sub clock signal OK-2 is turned-off (e.g., indicated as SNA-9). In a second internal state 350 of the application processor 100, when receiving the sensing-data SD is required, and it is predicted that a processing of the sensing-data SD is needed, the external clock source 220 that generates the external sub clock signal OK-2 is prepared (e.g., indicated as SNA-10). In the second internal state 350 of the application processor 100, when receiving the sensing-data SD is not required, but it is predicted that a processing of the sensing-data SD is needed, the internal clock source 160 that generates the internal clock signal IK is turned-off, and the external clock source 220 that generates the external sub clock signal OK-2 is prepared (e.g., indicated as SNA-11). In the second internal state 350 of the application processor 100, when receiving the sensing-data SD is not required, and it is predicted that processing of the sensing-data SD is not needed, the internal clock source 160 that generates the internal clock signal IK is turned-off (e.g., indicated as SNA-12). As described above, the sensor sub-system 140 may selectively receive a clock signal from the internal clock source 140 or the external clock source 220 based on an internal state of the application processor 100. Although not illustrated in FIG. 8, while the sensor sub-system 140 processes the sensing-data SD in the sleep mode of the application processor 100, the sensor sub-system 140 may change an operating mode of the application processor 100 from the sleep mode to the active mode if a memory unit (e.g., buffer) included in the sensor sub-system 140 becomes entirely full or is filled beyond a threshold. For example, when this occurs, based on an external main clock signal OK-1 received from the external clock source 220, the main central processing device 120 of the application processor 100 may assist the sensor sub-system 140 in processing the sensing-data SD.

Figure 9:
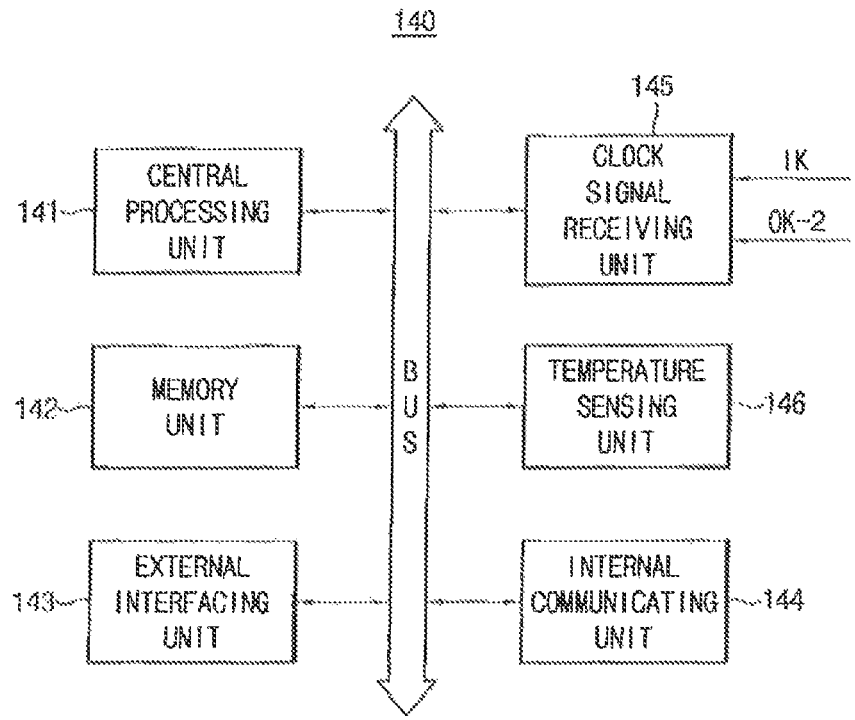
FIG. 9 is a block diagram illustrating a sensor sub-system included in an application processor of FIG. 1 according to an exemplary embodiment of the inventive concept.

FIG. 9 is a block diagram illustrating a sensor sub-system included in an application processor of FIG. 1 according to an exemplary embodiment of the inventive concept.

Referring to FIG. 9, the sensor sub-system 140 includes a central processing unit 141, a memory unit 142, an external interfacing unit 143, an internal communicating unit 144, a clock signal receiving unit 145, and a temperature sensing unit 146.

The central processing unit 141 may control an overall operation of the sensor sub-system 140. For example, the central processing unit 141 may control the memory unit 142, the external interfacing unit 143, the internal communicating unit 144, and the clock signal receiving unit 145. The memory unit 142 may include at least one memory device. Here, the memory unit 142 may act as a buffer that temporarily stores the sensing-data SD received from at least one sensor module 210, and thus may store internal codes, internal data, etc. for the sensor sub-system 140. The external interfacing unit 143 may receive the sensing-data SD from the sensor module 210. The internal communicating unit 144 may control the sensor sub-system 140 to communicate with the main central processing device 120 of the application processor 100. Depending on an operating speed required for processing the sensing-data SD received from the sensor module 210 on a predetermined cycle, the clock signal receiving unit 145 may receive the internal clock signal IK from at least one internal clock source 160, or may receive the external sub clock signal OK-2 from at least one external clock source 220. In other words, based on an operating speed required for processing the sensing-data SD, a clock signal for operating the sensor sub-system 140 may be selected as the internal clock signal IK or the external sub clock signal OK-2. Although it is illustrated in FIG. 9 that the clock signal receiving unit 145 receives one of the internal clock signal IK and the external sub clock signal OK-2, the clock signal receiving unit 145 may receives one of a plurality of internal clock signals IK and a plurality of external sub clock signals OK-2. As described above, the internal clock source 160 may be implemented as an on-chip oscillator or a real-time clock, and the external clock source 220 may be implemented as a phase locked loop that is coupled to an off-chip oscillator. Thus, the sensor sub-system 140 may operate based on the external sub clock signal OK-2 received from the external clock source 220 when a relatively high performance level is required, and may operate based on the internal clock signal IK received from the internal clock source 160 when a relatively low performance level is required.

The temperature sensing unit 146 may sense an ambient temperature to generate temperature information, or may receive the temperature information. Here, the ambient temperature may correspond to a temperature of the application processor 100 or a temperature of a mobile device. In an exemplary embodiment, the temperature sensing unit 146 generates the temperature information by sensing the ambient temperature. In an exemplary embodiment, the temperature sensing unit 146 receives the temperature information from the main central processing device 120 of the application processor 100 using the internal communicating unit 144. A wake-up time and a data-read time of the sensor module 210 may be determined by assuming a worst temperature case regardless of an actual ambient temperature. However, then the application processor 100 may spend a long time in a stand-by mode when it receives the sensing-data SD from the sensor module at a normal temperature (e.g., not worst temperature case). Thus, in an exemplary embodiment, the sensor sub-system 140 adjusts the wake-up time and the data-read time of the sensor module 210 based on the temperature information, and thus may reduce unnecessary power consumption. When the wake-up time and the data-read time of the sensor module 210 decrease, the sensor sub-system 140 may decrease an operating speed required for processing the sensing-data SD by increasing a data-processing time. In other words, since the data-processing time (e.g., a time for processing the sensing-data SD) increases as the wake-up time and the data-read time of the sensor module 210 decrease, the sensor sub-system 140 can decrease an operating speed required for processing the sensing-data SD. In an exemplary embodiment, the sensor sub-system 140 adjusts the wake-up time and the data-read time of the sensor module 210 using a matching table in which the temperature information are matched to the wake-up time and the data-read time of the sensor module 210. In an exemplary embodiment, the sensor sub-system 140 adjusts the wake-up time and the data-read time of the sensor module 210 by calculating the wake-up time and the data-read time of the sensor module 210 based on the temperature information in real-time.

The application processor 100 includes the sensor sub-system 140 and the internal clock source 160, and may control the sensor sub-system 140 to process the sensing-data SD received from the sensor module 210 when the sensor module 210 senses external environmental events on a predetermined cycle in the active mode or the sleep mode of the application processor 100. Here, since the sensor sub-system 140 selectively receives a clock signal from the internal clock source 160 or the external clock source 220 based on an operating speed required for processing the sensing-data SD, the application processor 100 may efficiently process the sensing-data SD (e.g., may satisfy requirements for a performance level improvement and a power consumption reduction). When an operating speed required for processing the sensing-data SD is excessive as compared to the external sub clock signal OK-2 that is received from the external clock source 220 as well as the internal clock signal IK that is received from the internal clock source 160, the sensor sub-system 140 may activate the main central processing device 120 using the internal communicating unit 144. When this occurs, an operating mode of the application processor 100 is changed from the sleep mode to the active mode. Thus, the main central processing device 120 of the application processor 100 may assist the sensor sub-system 140 in processing the sensing-data SD based on an external main clock signal OK-1 received from the external clock source 220. In addition, the sensor sub-system 140 may adjust the wake-up time and the data-read time of the sensor module 210 based on the temperature information. On this basis, the sensor sub-system 140 may reduce power consumption by decreasing an operating speed required for processing the sensing-data SD. In an exemplary embodiment, while the main central processing device 120 of the application processor 100 performs a specific operation based on the external main clock signal OK-1, an operating mode of the application processor 100 is changed from the active mode to the sleep mode to reduce unnecessary power consumption when an operating speed required for processing the sensing-data SD decreases. In an exemplary embodiment, when an operating mode of the application processor 100 is changed from the active mode to the sleep mode, the sensor sub-system 140 performs a specific operation performed by the main central processing device 120 of the application processor 100.

Figure 10:
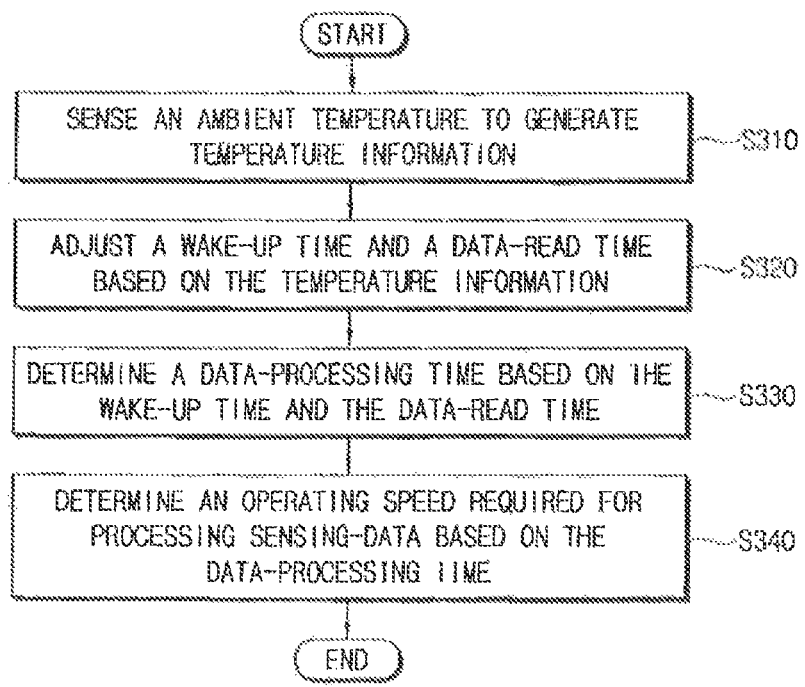
FIG. 10 is a flow chart illustrating a method of selecting a clock signal for a sensor sub-system of FIG. 9 according to an exemplary embodiment of the inventive concept.
Figure 11:
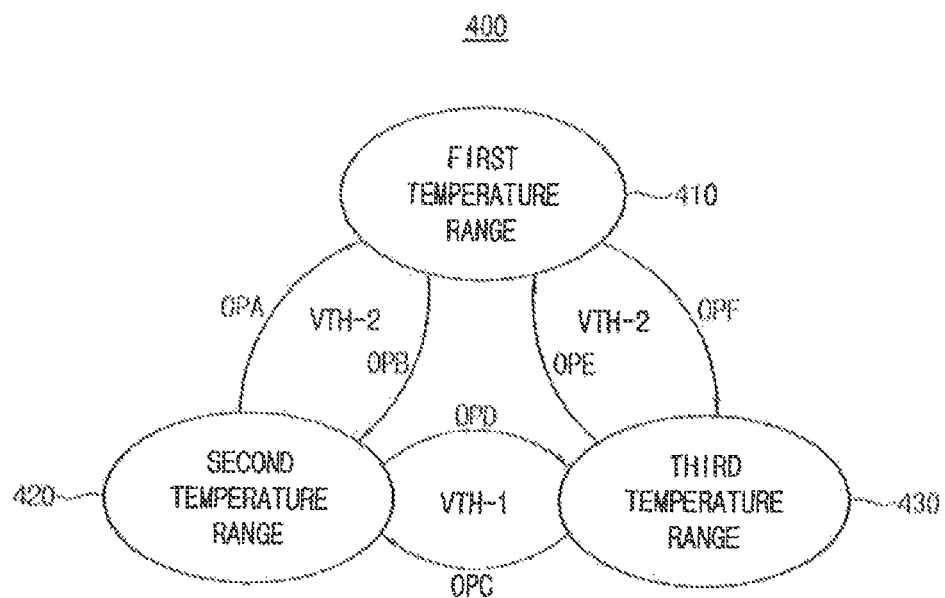
FIG. 11 is a concept diagram illustrating an example in which a clock signal is selected for a sensor sub-system of FIG. 9.

FIG. 10 is a flow chart illustrating a method of selecting a clock signal for a sensor sub-system of FIG. 9 according to an exemplary embodiment of the inventive concept. FIG. 11 is a concept diagram illustrating an example in which a clock signal is selected for a sensor sub-system of FIG. 9.

Referring to FIGS. 10 and 11, the method includes sensing (e.g., sensor sub-system 140) an ambient temperature to generate temperature information (S310), adjusting a wake-up time and a data-read time of at least one sensor module 210 based on the temperature information (S320), determining a data-processing time based on the wake-up time and the data-read time of the sensor module 210 (S330), and determining an operating speed required for processing sensing-data SD based on the data-processing time (S340).

As described above, in an active mode or a sleep mode of an application processor 100, the application processor 100 may control the sensor sub-system 140 to process the sensing-data SD based on an internal clock signal IK received from at least one internal clock source 160 or an external sub clock signal OK-2 received from at least one external clock source 220. In addition, in the active mode of the application processor 100, the application processor 100 may control a main central processing device 120 to perform a specific operation based on an external main clock signal OK-1 received from the external clock source 220. However, in the sleep mode of the application processor 100, the application processor 100 may control the main central processing device 120 not to operate. Here, the sensor sub-system 140 may decrease an operating speed required for processing the sensing-data by adjusting the wake-up time and the data-read time of the sensor module 210 based on the temperature information. As a result, power consumption may be reduced. It is assumed in FIG. 11 that other things are equal except for the wake-up time and the data-read time of the sensor module 210 when an internal state of the application processor 100 is determined. As illustrated in FIG. 11, an internal state of the application processor 100 is determined based on the wake-up time and the data-read time of the sensor module 210. Here, a first internal state 410 corresponds to the active mode of the application processor 100. In addition, a second internal state 420 and a third internal state 430 corresponds to the sleep mode of the application processor 100. That is, the first internal state 410 indicates a state in which the sensor sub-system 140 processes the sensing-data SD based on the internal clock signal IK or the external sub clock signal OK-2, and the main central processing device 120 performs a specific operation based on the external main clock signal OK-1. In addition, the second internal state 420 indicates a state in which the sensor sub-system 140 processes the sensing-data SD based on the internal clock signal IK, but the main central processing device 120 does not operate. Further, the third internal state 430 indicates a state in which the sensor sub-system 140 processes the sensing-data SD based on the external sub clock signal OK-2, but the main central processing device 120 does not operate.

For example, while the application processor 100 operates in the first internal state 410, the data-processing time may increase as the wake-up time and the data-read time of the sensor module 210 decrease based on the temperature information, and thus an operating speed required for processing the sensing-data SD may become less than a second threshold value VTH-2. When this occurs, an operating mode of the application processor 100 is changed from the active mode to the sleep mode. Thus, an internal state of the application processor 100 may be changed to the second internal state 420 or the third internal state 430 (e.g., indicated as OPB and OPF). In other words, an operating speed required for processing the sensing-data SD may decrease because the data-processing time (e.g., a time for processing the sensing-data SD) increases as the wake-up time and the data-read time of the sensor module 210 decrease. In addition, while the application processor 100 operates in the second internal state 420, the data-processing time may decrease as the wake-up time and the data-read time of the sensor module 210 increase based on the temperature information, and thus an operating speed required for processing the sensing-data SD may become greater than a first threshold value VTH-1. When this occurs, an internal state of the application processor 100 may be changed to the third internal state 430 (e.g., indicated as OPD). On the other hand, while the application processor 100 operates in the third internal state 430, the data-processing time may increase as the wake-up time and the data-read time of the sensor module 210 decrease based on the temperature information, and thus an operating speed required for processing the sensing-data SD may become less than the first threshold value VTH-1. When this occurs, an internal state of the application processor 100 may be changed to the second internal state 420 (e.g., indicated as OPC). Further, while the application processor 100 operates in the second internal state 420 or the third internal state 430, the data-processing time may decrease as the wake-up time and the data-read time of the sensor module 210 increase based on the temperature information, and thus an operating speed required for processing the sensing-data SD may become greater than the second threshold value VTH-2. When this occurs, an operating mode of the application processor 100 is changed from the sleep mode to the active mode. Thus, an internal state of the application processor 100 may be changed to the first internal state 410 (e.g., indicated as OPA and OPE). As described above, assuming that other things are equal except for the wake-up time and the data-read time of the sensor module 210, when an internal state of the application processor 100 is determined, the first internal state 410 corresponds to a first temperature range, the second internal state 420 corresponds to a second temperature range, and the third internal state 430 corresponds to a third temperature range. However, the present inventive concept is not limited thereto.

Figure 12:
FIG. 12 is a diagram illustrating an example in which a wake-up time and a data-read time of a sensor module are determined based on sensing-temperature information by a sensor sub-system of FIG. 9.
Figure 13A:
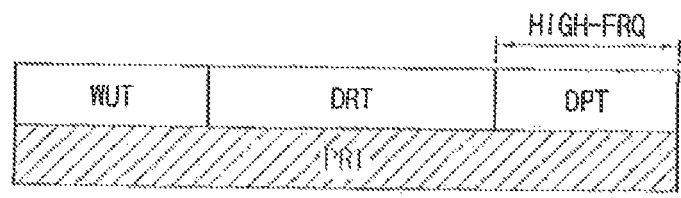
FIGS. 13A and 13B are diagrams illustrating an exemplary scenario in which a clock signal is selected based on sensing-temperature information by a sensor sub-system of FIG. 9.
Figure 13B:
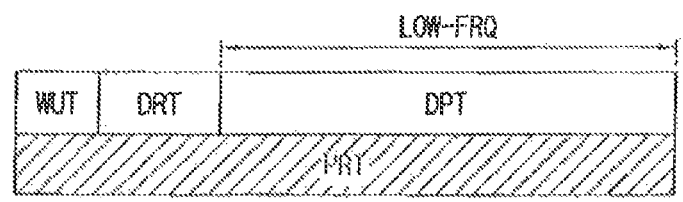

FIG. 12 is a diagram illustrating an example in which a wake-up time and a data-read time of a sensor module are determined based on sensing-temperature information by a sensor sub-system of FIG. 9. FIGS. 13A and 13B are diagrams illustrating an exemplary scenario in which a clock signal is selected based on sensing-temperature information by a sensor sub-system of FIG. 9.

Referring to FIGS. 12, 13A, and 13B, the sensor sub-system 140 adjusts a wake-up time WUT and a data-read time DRT of at least one sensor module 210 within a predetermined time PRT based on temperature information, where the sensor sub-system 140 senses an ambient temperature to generate the temperature information, and determines a data-processing time DPT based on the wake-up time WUT and the data-read time DRT. For example, if the sensor sub-system 140 is operated with a 50% duty cycle with a cycle time of 100 ms, the predetermined time PRT would be 50 ms. During the next 50 ms the sensor sub-system 140 may be idle or powered off (e.g., "asleep"). Thus, the sensor sub-system 140 needs some time to wakeup (e.g. time WUT) before it can retrieve (read) sensor data during the data-read time DRT and process the retrieved data during the data-processing time DRT. In an exemplary embodiment, the predetermined time PRT is determined as a sum of the wake-up time WUT, the data-read time DRT, and the data-processing time DPT in a worst temperature case. FIG. 13A shows the wake-up time WUT, the data-read time DRT, and the data-processing time DRT that are determined in a worst temperature case (e.g., when an ambient temperature is the worst temperature). FIG. 13B shows the wake-up time WUT, the data-read time DRT, and the data-processing time DPT that are determined based on the temperature information generated by sensing the ambient temperature. As illustrated in FIGS. 13A and 13B, the sensor sub-system 140 increases the data-processing time DPT based on the temperature information when the wake-up time WUT and the data-read time DRT of the sensor module 210 decrease. As a result, the sensor sub-system 140 may decrease an operating speed required for processing sensing-data SD because the data-processing time DPT (e.g., a time for processing the sensing-data SD) increases. As illustrated in FIG. 13A, the data-processing time DPT may decrease when the wake-up time WUT and the data-read time DRT of the sensor module 210 increase in the worst temperature case (e.g., when the ambient temperature is the worst temperature). Thus, an operating speed required for processing the sensing-data SD may increase because the data-processing time DPT (e.g., a time for processing the sensing-data SD) decreases. That is, since a relatively high operating speed HIGH-FRQ is required to process the sensing-data SD in FIG. 13A, the sensor sub-system 140 receives an external sub clock signal OK-2 from at least one external clock source 220. On the other hand, as illustrated in FIG. 13B, the data-processing time DPT increases when the wake-up time WUT and the data-read time DRT of the sensor module 210 decrease based on the temperature information. Thus, an operating speed required for processing the sensing-data SD may decrease because the data-processing time DPT (e.g., a time for processing the sensing-data SD) increases. That is, since a relatively low operating speed LOW-FRQ is required to process the sensing-data SD in FIG. 13B, the sensor sub-system 140 receives an internal clock signal IK from at least one internal clock source 160. As described above, the sensor sub-system 140 may adjust an operating speed required for processing the sensing-data SD based on the temperature information, and may selectively receive a clock signal from the internal clock source 160 or the external clock source 220 reflecting an operating speed required for processing the sensing-data SD. As a result, the sensor sub-system 140 may efficiently process the sensing-data SD (e.g., may satisfy requirements for a performance level improvement and a power consumption reduction).

Figure 14:
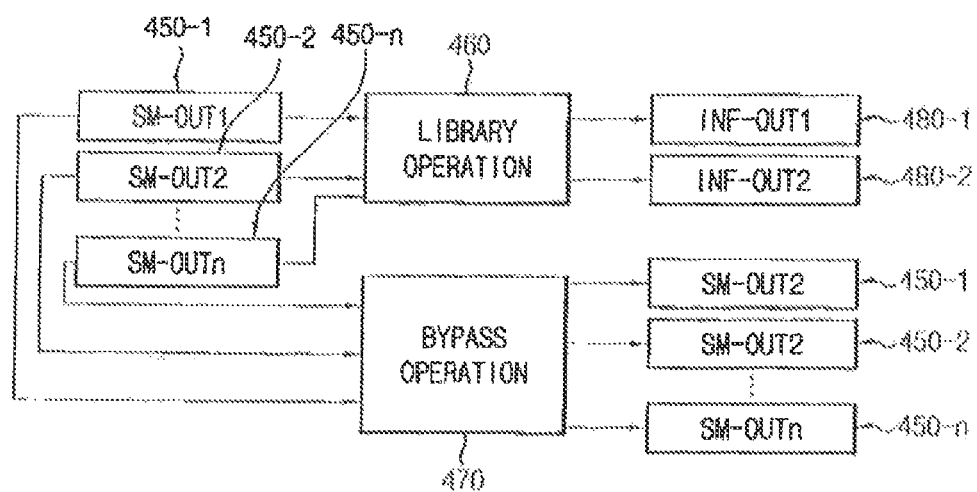
FIG. 14 is a block diagram illustrating a library operation and a bypass operation of a sensor sub-system included in an application processor of FIG. 1.

FIG. 14 is a block diagram illustrating a library operation and a bypass operation of a sensor sub-system included in an application processor of FIG. 1.

Referring to FIG. 14, the sensor sub-system 140 performs the library operation 460 or the bypass operation 470. For example, in an active mode or a sleep mode of an application processor 100, the sensor sub-system 140 performs the library operation 460 that receives (reads) sensing-data 450-1 through 450-n from at least one sensor module 210, that generates processing-data 480-1 and 480-2 based on the sensing-data 450-1 through 450-n, and that outputs the processing-data 480-1 and 480-2 to a main central processing device 120 of the application processor 100. Alternately, in the active mode or the sleep mode of the application processor 100, the sensor sub-system 140 may perform the bypass operation 470 that receives the sensing-data 450-1 through 450-n from the sensor module 210, and that outputs (e.g., delivers) the sensing-data 450-1 through 450-n to the main central processing device 120 of the application processor 100. In an exemplary embodiment, the main central processing device 120 directly receives the sensing-data 450-1 through 450-n from the sensor module 210 (e.g., not via the sensor sub-system 140) in the active mode of the application processor 100. The sensing-data 450-1 through 450-n may be generated by the sensor module 210. The sensor module 210 may include a gyro sensor module that measures a rotating angular speed, an acceleration sensor module that measures a speed and a momentum, a geomagnetic field sensor module that acts as a compass, a barometer sensor module that measures an altitude, a gesture-proximity-illumination sensor module that performs various operations such as a motion recognition, a proximity detection, a illumination measurement, etc., a temperature-humidity sensor module that measures a temperature and a humidity, and a grip sensor module that determines whether a mobile device is gripped by a user. However, a kind of the sensor module 210 is not limited thereto.

In the active mode or the sleep mode of the application processor 100, when a battery is in a low battery state, the sensor sub-system 140 may decrease an operating speed required for processing the sensing-data 450-1 through 450-n by turning-off (e.g., referred to as a power-off) at least one of the sensor module 210 (e.g., some of a plurality of sensor modules 210). In an exemplary embodiment, while the sensor sub-system 140 performs the library operation 460 in the active mode or the sleep mode of the application processor 100, the sensor sub-system 140 turns-off at least one of the sensor module 210 having a relatively low importance when a battery is in a low battery state. For example, the sensor sub-system 140 may generate position-data by performing the library operation 460 in the active mode or the sleep mode of the application processor 100. For example, if it is assumed the barometer sensor module has a relatively low importance as compared to the acceleration sensor module, the gyro sensor module, the geomagnetic field sensor module, etc., the sensor sub-system 140 turn-offs the barometer sensor module when a battery is in a low battery state. As a result, a quantity of the sensing-data 450-1 through 450-n input to the sensor sub-system 140 may decrease, and thus an operating speed required for processing the sensing-data 450-1 through 450-n may decrease. In this way, when the sensor sub-system 140 processes the sensing-data 450-1 through 450-n, the sensor sub-system 140 may reduce power consumption by lowering an accuracy of the monitoring of the external environmental events. In an exemplary embodiment, while the sensor sub-system 140 performs the bypass operation 470 in the active mode or the sleep mode of the application processor 100, the sensor sub-system 140 decreases an operating speed required for processing the sensing-data 450-1 through 450-n by reducing the number of times the sensor module 210 performs a sensing operation when a battery is in a low battery state. For example, assuming that the sensor sub-system 140 provides the sensing-data 450-1 through 450-n to the main central processing device 120 of the application processor 100 ten times per second, when the sensor module 210 generates (e.g., measures) the sensing-data 450-1 through 450-n to output the sensing-data 450-1 through 450-n to the sensor sub-system 140, the sensor sub-system 140 may copy the sensing-data 450-1 through 450-n nine times, and then may provide the sensing-data 450-1 through 450-n (e.g., one measured sensing-data and nine copied sensing-data) to the main central processing device 120 of the application processor 100. In this way, when the sensor sub-system 140 processes the sensing-data 450-1 through 450-n, the sensor sub-system 140 may reduce power consumption by lowering an accuracy of the monitoring of the external environmental events.

As described above, while the sensor sub-system 140 performs the library operation 460 or the bypass operation in the active mode or the sleep mode of the application processor 100, the sensor sub-system 140 may control the number of times the sensor module 210 is accessed based on a battery state (e.g., depending on whether a battery is in a normal battery state or in a low battery state). Thus, the sensor sub-system 140 may reduce power consumption by lowering an accuracy of the monitoring of the external environmental events when a battery is in a low battery state. In addition, since the sensor sub-system 140 decreases an operating speed required for processing the sensing-data 450-1 through 450-n when a battery is in a low battery state in the active mode or the sleep mode of the application processor 100, the sensor sub-system 140 may selectively receive a clock signal from at least one internal clock source 160 or at least one external clock source 220 reflecting an operating speed required for processing the sensing-data 450-1 through 450-n. As a result, the application processor 100 may efficiently process the sensing-data 450-1 through 450-1 (e.g., may satisfy requirements for a performance level improvement and a power consumption reduction). In an exemplary embodiment, an operation of the sensor sub-system 140 that decreases an operating speed required for processing the sensing-data 450-1 through 450-n by turning-off at least one of the sensor module 210 when a battery is in a low battery state is performed by software. Similarly, an operation of the sensor sub-system 140 that decreases an operating speed required for processing the sensing-data 450-1 through 450-n by reducing the number of times the sensor module 210 performs the sensing operation when a battery is in a low battery state may be performed by software. However, the present inventive concept is not limited thereto.

Figure 15:
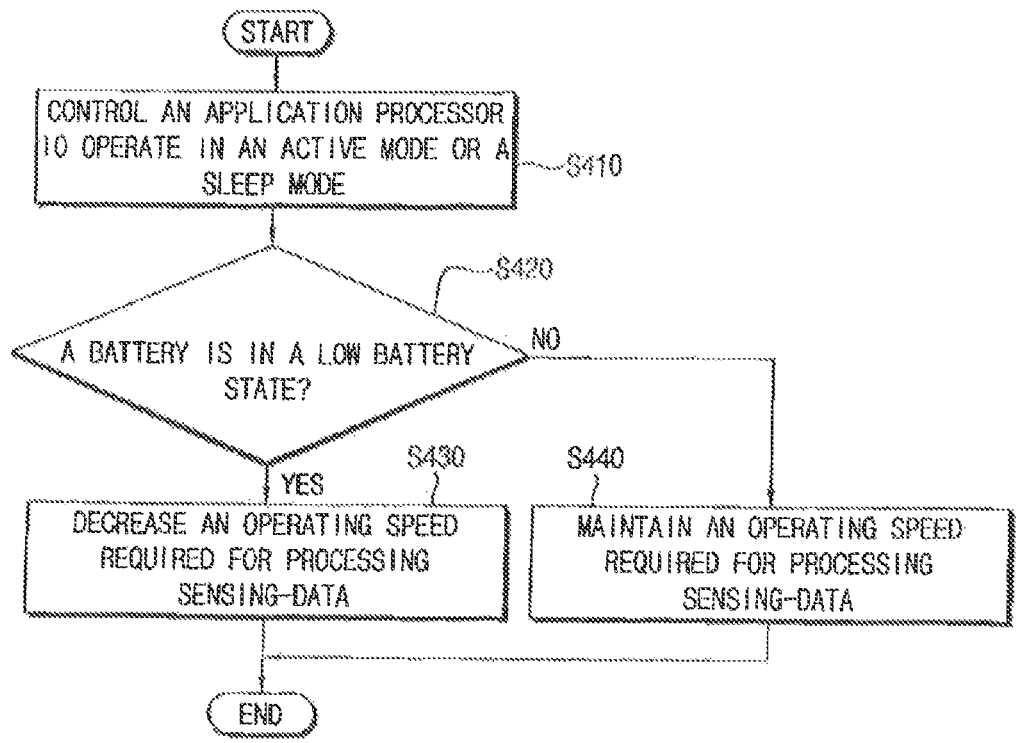
FIG. 15 is a flow chart illustrating a method of selecting a clock signal based on a battery state for a sensor sub-system included in an application processor of FIG. 1 according to an exemplary embodiment of the inventive concept.
Figure 16:
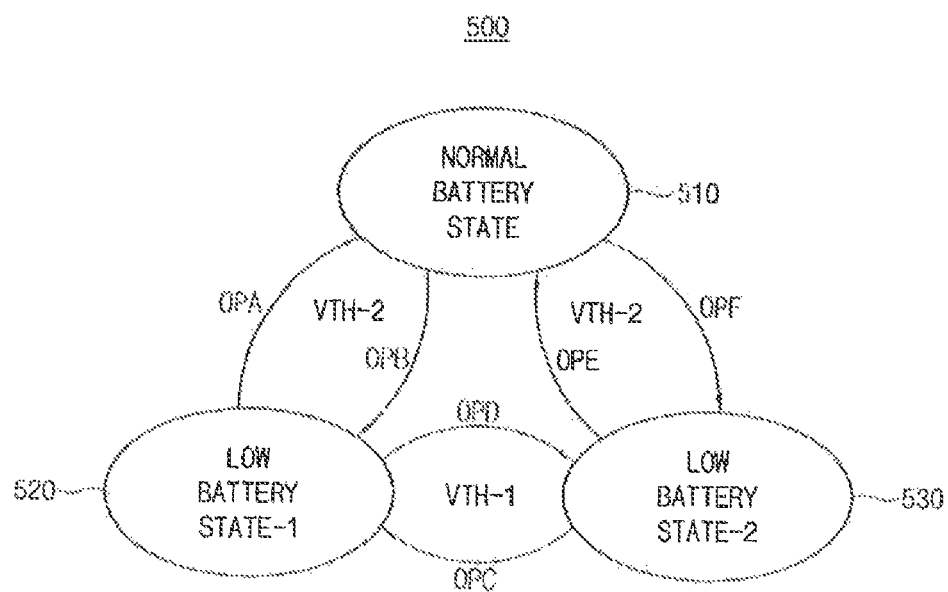
FIG. 16 is a concept diagram illustrating an example in which a clock signal is selected based on a battery state for a sensor sub-system included in an application processor of FIG. 1.

FIG. 15 is a flow chart illustrating a method of selecting a clock signal based on a battery state for a sensor sub-system included in an application processor of FIG. 1. FIG. 16 is a concept diagram illustrating an example in which a clock signal is selected based on a battery state for a sensor sub-system included in an application processor of FIG. 1.

Referring to FIGS. 15 and 16, the method includes controlling the application processor 100 to operate in an active mode or a sleep mode (S410), and determining (e.g., by the sensor sub-system 140) whether a battery is in a low battery state (S420). When the battery is in the low battery state, the method includes decreasing (e.g., sensor sub-system 140) an operating speed required for processing sensing-data 450-1 through 450-n (S430). On the other hand, when the battery is not in the low battery state (e.g., when the battery is in a normal battery state), the method includes maintaining (e.g, by sensor sub-system 140) an operating speed required for processing the sensing-data 450-1 through 450-n (S440).

As described above, in the active mode or the sleep mode of the application processor 100, the application processor 100 may control the sensor sub-system 140 to process sensing-data 450-1 through 450-n based on an internal clock signal IK received from at least one internal clock source 160 or an external sub clock signal OK-2 received from at least one external clock source 220. In addition, the application processor 100 may control a main central processing device 120 to perform a specific operation based on an external main clock signal OK-1 received from at least one external clock source 220 in the active mode of the application processor 100. On the other hand, the application processor 100 may control the main central processing device 120 not to operate in the sleep mode of the application processor 100. In the active mode or the sleep mode of the application processor 100, the application processor 100 may control the sensor sub-system 140 to process the sensing-data 450-1 through 450-n based on an internal clock signal IK received from at least one internal clock source 160 or an external sub clock signal OK-2 received from at least one external clock source 220. While the sensor sub-system 140 performs the library operation 460 or the bypass operation 470, the sensor sub-system 140 may decrease an operating speed required for processing the sensing-data 450-1 through 450-n by turning-off at least one of the sensor module 210, or by reducing the number of times at least one sensor module 210 performs a sensing operation when a battery is in a low battery state. As described above, the sensor sub-system 140 may perform the library operation 460 by receiving the sensing data 450-1 through 450-n from the sensor module 210, by generating processing-data 480-1 and 480-2 based on the sensing-data 450-1 through 450-n, and by outputting the processing-data 480-1 and 480-2 to the main central processing device 120 of the application processor 100. In addition, the sensor sub-system 140 may perform the bypass operation 470 by receiving the sensing-data 450-1 through 450-n from the sensor module 210, and by outputting (e.g., delivering) the sensing-data 450-1 through 450-n to the main central processing device 120 of the application processor 100. It is assumed in FIG. 16 that other things are equal except for a battery state when an internal state of the application processor 100 is determined. As illustrated in FIG. 16, a first internal state 510 corresponds to the active mode of the application processor 100. In addition, a second internal state 520 and a third internal state 530 corresponds to the sleep mode of the application processor 100. That is, the first internal state 510 indicates a state in which the sensor sub-system 140 processes the sensing-data 450-1 through 450-n based on the internal clock signal IK or the external sub clock signal OK-2, and the main central processing device 120 performs a specific operation based on the external main clock signal OK-1. In addition, the second internal state 520 indicates a state in which the sensor sub-system 140 processes the sensing-data 450-1 through 450-n based on the internal clock signal IK, but the main central processing device 120 does not operate. Further, the third internal state 530 indicates a state in which the sensor sub-system 140 processes the sensing-data 450-1 through 450-n based on the external sub clock signal OK-2, but the main central processing device 120 does not operate.

For example, while the application processor 100 operates in the first internal state 510, an operating speed required for processing the sensing-data 450-1 through 450-n may become less than a second threshold value VTH-2 based on a battery state. When this occurs, an operating mode of the application processor 100 is changed from the active mode to the sleep mode. That is, an internal state of the application processor 100 may be changed to the second internal state 520 or the third internal state 530 (e.g., indicated as OPB and OPF). In addition, while the application processor 100 operates in the second internal state 520, an operating speed required for processing the sensing-data 450-1 through 450-n may become greater than a first threshold value VTH-1 based on a battery state. When this occurs, an internal state of the application processor 100 may be changed to the third internal state 530 (e.g., indicated as OPD). On the other hand, while the application processor 100 operates in the third internal state 530, an operating speed required for processing the sensing-data 450-1 through 450-n may become less than the first threshold value VTH-1 based on a battery state. When this occurs, an internal state of the application processor 100 may be changed to the second internal state 520 (e.g., indicated as OPC). Further, while the application processor 100 operates in the second internal state 520 or the third internal state 530, an operating speed required for processing the sensing-data 450-1 through 450-n may become greater than the second threshold value VTH-2. When this occurs, an operating mode of the application processor 100 is changed from the sleep mode to the active mode. That is, an internal state of the application processor 100 may be changed to the first internal state 510 (e.g., indicated as OPA and OPE). Here, a battery state may be changed from a normal battery state to a low battery state as a battery is used. On the other hand, a battery state may be changed from the low battery state to the normal battery state as the battery is charged. As described above, assuming that other things are equal except for a battery state when an internal state of the application processor 100 is determined, the first internal state 510 corresponds to the normal battery state, the second internal state 520 corresponds to the low battery state (e.g., a first low battery state), and the third internal state 530 corresponds to the low battery state (e.g., a second low battery state). However, the present inventive concept is not limited thereto.

Figure 17:
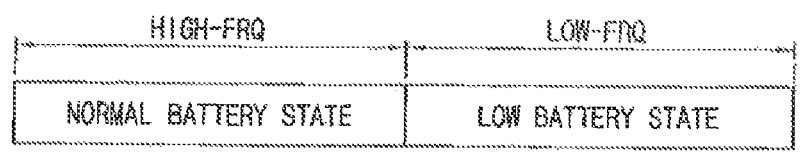
FIG. 17 is a diagram illustrating an exemplary scenario in which a clock signal is selected based on a battery state for a sensor sub-system included in an application processor of FIG. 1.

FIG. 17 is a diagram illustrating an exemplary scenario in which a clock signal is selected based on a battery state for a sensor sub-system included in an application processor of FIG. 1.

Referring to FIG. 17, the sensor sub-system 140 changes an operating speed required for processing sensing-data 450-1 through 450-n by controlling the number of times at least one sensor module 210 is accessed based on a battery state (e.g., depending on whether a battery is in a normal battery state or in a low battery state). As illustrated in FIG. 17, while the sensor sub-system 140 performs a library operation 460 or a bypass operation 470 in an active mode or a sleep mode of the application processor 100, the sensor sub-system 140 turns-off at least one of the sensor module 210, or may reduce the number of times at least one sensor module 210 performs a sensing operation when a battery is in a low battery state. As described above, the sensor sub-system 140 may perform the library operation 460 by receiving the sensing data 450-1 through 450-n from the sensor module 210, by generating processing-data 480-1 and 480-2 based on the sensing-data 450-1 through 450-n, and by outputting the processing-data 480-1 and 480-2 to a main central processing device 120 of the application processor 100. In addition, the sensor sub-system 140 may perform the bypass operation 470 by receiving the sensing-data 450-1 through 450-n from the sensor module 210, and by outputting (e.g., delivering) the sensing-data 450-1 through 450-n to the main central processing device 120 of the application processor 100. As a result, an operating speed required for processing the sensing-data 450-1 through 450-n may be maintained (e.g., a relatively high operating speed HIGH-FRQ) when a battery is in a normal battery state, and an operating speed required for processing the sensing-data 450-1 through 450-n may be reduced (e.g., a relatively low operating speed LOW-FRQ) when a battery is in a low battery state. In an exemplary embodiment, the sensor sub-system 140 changes an operating mode of the application processor 100 from the active mode to the sleep mode by decreasing an operating speed required for processing the sensing-data 450-1 through 450-n to less than a second threshold value VTH-2 based on a battery state. In addition, the sensor sub-system 140 may change an operating mode of the application processor 100 from the sleep mode to the active mode by increasing an operating speed required for processing the sensing-data 450-1 through 450-n to more than the second threshold value VTH-2 based on a battery state. In an exemplary embodiment, the sensor sub-system 140 operates based on an internal clock signal IK received from at least one internal clock source 160 by decreasing an operating speed required for processing the sensing-data 450-1 through 450-n to less than a first threshold value VTH-1 based on a battery state. In addition, the sensor sub-system 140 may operate based on an external sub clock signal OK-2 received from at least one external clock source 220 by increasing an operating speed required for processing the sensing-data 450-1 through 450-n to more than the first threshold value VTH-1 based on a battery state. As described above, the application processor 100 may efficiently process the sensing-data 450-1 through 450-n (e.g., may satisfy requirements for a performance level improvement and a power consumption reduction) because the sensor sub-system 140 adjusts an operating speed required for processing the sensing-data 450-1 through 450-n based on a battery state.

Figure 18:
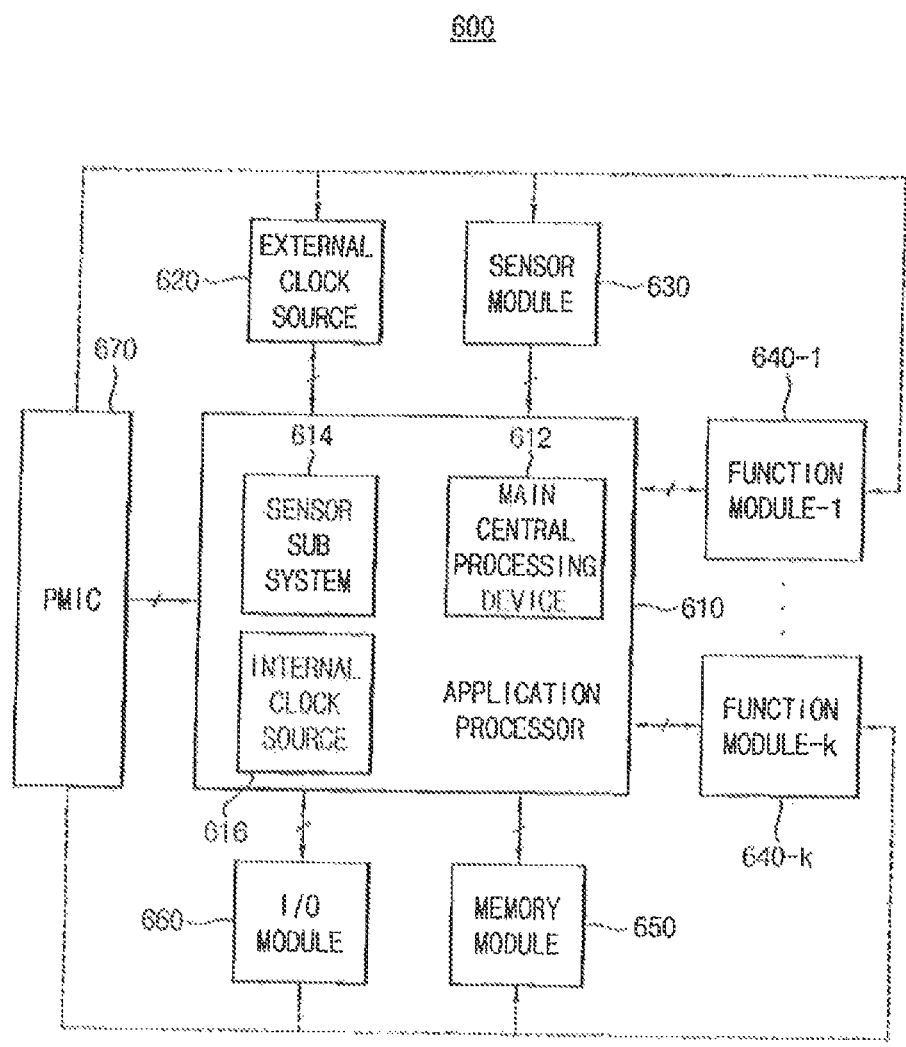
FIG. 18 is a block diagram illustrating a mobile device according to an exemplary embodiment of the inventive concept.
Figure 19:
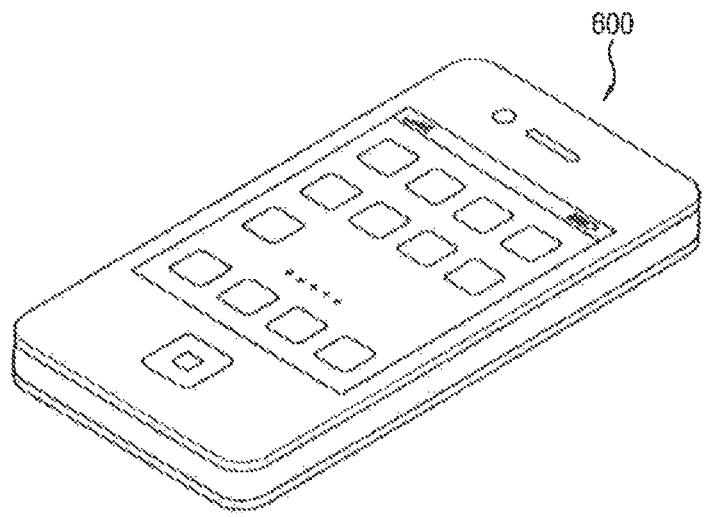
FIG. 19 is a diagram illustrating a mobile device of FIG. 18 implemented as a smart-phone according to an exemplary embodiment of the inventive concept.

FIG. 18 is a block diagram illustrating a mobile device according to an exemplary embodiment of the inventive concept. FIG. 19 is a diagram illustrating the mobile device of FIG. 18 implemented as a smart-phone according to an exemplary embodiment of the inventive concept.

Referring to FIGS. 18 and 19, the mobile device 600 includes an application processor 610, at least one external clock source 620, at least one sensor module 630, a plurality of function modules 640-1 through 640-k, a memory module 650, an input/output (I/O) module 660, and a power management integrated circuit (PMIC) 670. The application processor 610 includes a main central processing device 612, a sensor sub-system 614, and at least one internal clock source 616. The main central processing device 612 may operate based on an external main clock signal received from the external clock source 620 in an active mode of the application processor 610. The internal clock source 616 may generate an internal clock signal. The sensor sub-system 614 may process sensing-data received from the sensor module 630 on a predetermined cycle based on the internal clock signal received from the internal clock source 616 or an external sub clock signal received from the external clock source 620 in the active mode or a sleep mode of the application processor 610. Although it is illustrated in FIG. 18 that one external clock source 620 and one internal clock source 616 are present in the mobile device 600, a plurality of external clock sources 620 and a plurality of internal clock sources 616 may be present in the mobile device 600. In an exemplary embodiment of the inventive concept, as illustrated in FIG. 19, the mobile device 600 is implemented as a smart-phone.

The application processor 610 may control an overall operation of the mobile device 600. That is, the application processor 610 may control the external clock source 620, the sensor module 630, the function modules 640-1 through 640-k, the memory module 650, the I/O module 660, the power management integrated circuit 670, etc. The sensor sub-system 614 may process the sensing-data based on the external sub clock signal received from the external clock source 620 or the internal clock signal received from the internal clock source 616 in the active mode or the sleep mode of the application processor 610. In an exemplary embodiment, the sensor sub-system 614 includes a memory unit having at least one memory device, an external interfacing unit that communicates with the sensor module 630, an internal communicating unit that communicates with the main central processing device 612, a clock signal receiving unit that selectively receives the internal clock signal or the external sub clock signal based on an operating speed required for processing the sensing-data, and a central processing unit that controls the memory unit, the external interfacing unit, the internal communicating unit, and the clock signal receiving unit. In an exemplary embodiment, the sensor sub-system 614 further includes a temperature sensing unit that generates temperature information by sensing an ambient temperature, or that receives the temperature information from other components. Since these are described above, the duplicated descriptions will not be repeated.

The external clock source 620 may generate the external main clock signal and the external sub clock signal. Alternately, the external clock source 620 may include a first external clock source 620 that generates the external main clock signal, and a second external clock source 620 that generates the external sub clock signal. The external clock source 620 may provide the external main clock signal to the main central processing device 612 in the active mode of the application processor 610, and may provide the external sub clock signal to the sensor sub-system 614 in the active mode or the sleep mode of the application processor 610. The sensor module 630 may perform a sensing operation in the active mode or the sleep mode of the application processor 100. That is, the sensor module 630 may sense external environmental events on a predetermined cycle in the active mode or the sleep mode of the application processor 100. As an example, the sensor module 630 may include a gyro sensor module that measures a rotating angular speed, an acceleration sensor module that measures a speed and a momentum, a geomagnetic field sensor module that acts as a compass, a barometer sensor module that measures an altitude, a gesture-proximity-illumination sensor module that performs various operations such as a motion recognition, a proximity detection, a illumination measurement, etc., a temperature-humidity sensor module that measures a temperature and a humidity, and a grip sensor module that determines whether a mobile device is gripped by a user. However, a kind of the sensor module 630 is not limited thereto. The function modules 640-1 through 640-*k* may perform various functions of the mobile device 600. For example, the mobile device 600 may include a communication module that performs a communication function (e.g., code division multiple access (CDMA) module, long term evolution (LTE) module, radio frequency (RF) module, ultra wideband (UWB) module, wireless local area network (WLAN) module, worldwide interoperability for microwave access (WIMAX) module, etc.), a camera module that performs a camera function, etc. In an exemplary embodiment, the mobile device 600 further includes a global positioning system (GPS) module, a microphone (MIC) module, a speaker module, etc. However, a kind of the function modules 640-1 through 640-*k* included in the mobile device 600 is not limited thereto.

The memory module 650 may store data for operations of the mobile device 600. For example, the memory module 650 may include a volatile semiconductor memory device such as a DRAM device, an SRAM device, a mobile DRAM, etc, and/or a non-volatile semiconductor memory device such as an EPROM device, an EEPROM device, a flash memory device, a PRAM device, an RRAM device, an NFGM device, a PoRAM device, an MRAM device, an FRAM device, etc. In an exemplary embodiment of the inventive concept, the memory module 650 furthers include a solid state drive (SSD), a hard disk drive (HDD), a CD-ROM, etc. The I/O module 660 may include a display module that performs a display function, a touch panel module that performs a touch sensing function, etc. As described above, the application processor 610 may include the sensor sub-system 140 and at least one internal clock source 616. On this basis, the application processor 610 may control the sensor sub-system 614 to process the sensing-data received from the sensor module 630 when the sensor module 630 senses the external environmental events on a predetermined cycle in the active mode or the sleep mode of the application processor 610. Here, since the sensor sub-system 614 selectively receives a clock signal from the internal clock source 616 or the external clock source 620 based on an operating speed required for processing the sensing-data, the application processor 610 having the sensor sub-system 614 may efficiently process the sensing-data (e.g., may satisfy requirements for a performance level and a power consumption reduction). In addition, since the sensor sub-system 614 adjusts an operating speed required for processing the sensing-data based on an ambient temperature and/or a battery state, the application processor 610 having the sensor sub-system 614 may efficiently process the sensing-data. As a result, the mobile device 600 may efficiently monitor the external environmental events in real-time.

Figure 20:
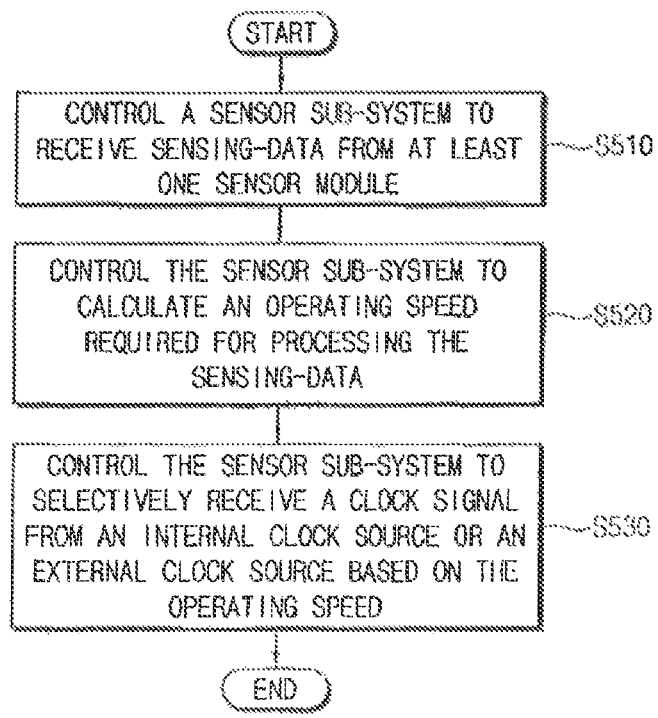
FIG. 20 is a flow chart illustrating a method of selecting a clock signal for an application processor according to an exemplary embodiment of the inventive concept.

FIG. 20 is a flow chart illustrating a method of selecting a clock signal for an application processor according to an exemplary embodiment of the inventive concept.

Referring to FIG. 20, an application processor may process sensing-data received from at least one sensor module on a predetermined cycle in an active mode or a sleep mode of the application processor. The method of FIG. 20 includes controlling a sensor sub-system (e.g., included in an application processor) to receive sensing-data from at least one sensor module (S510), and controlling the sensor sub-system to calculate an operating speed required for processing the sensing-data (520). Subsequently, the method of FIG. 20 includes controlling the sensor sub-system to selectively receive a clock signal from at least one internal clock source or at least one external clock source based on an operating speed required for processing the sensing-data (S530). The internal clock source is located inside the application processor, and the external clock source is located outside the application processor. As a result, the method of FIG. 20 may control the sensor sub-system included in the application processor to process the sensing-data received from the sensor module when the sensor module senses external environmental events on a predetermined cycle in the active mode or the sleep mode of the application processor. Since the sensor sub-system selectively receives a clock signal from the internal clock source or the external clock source based on an operating speed required for processing the sensing-data, the sensing-data may be efficiently processed (e.g., requirements for a performance level and a power consumption reduction may be satisfied).

Although an application processor, a mobile device having the application processor, and a method of selecting a clock signal for the application processor are described with reference to FIGS. 1 through 20, the present inventive concept is not limited thereto. For example, a logic circuit that performs substantially the same functions/operations as the sensor sub-system included in the application processor may be included in a specific chip. In addition, although one internal clock source, one external clock source, and one sensor module are illustrated in FIG. 1, the number of the internal clock source, the number of the external clock source, and the number of the sensor module are not limited thereto.

The present inventive concept may be applied to an electronic device (e.g., a mobile device) having an application processor. For example, the present inventive concept may be applied to a computer, a laptop, a digital camera, a cellular phone, a smart-phone, a smart-pad, a tablet computer, a personal digital assistant (PDA), a portable multimedia player (PMP), an MP3 player, a navigation system, a video camcorder, a portable game console, etc.

The foregoing is illustrative of example embodiments of the inventive concept and is not to be construed as limiting thereof. Although a few exemplary embodiments have been described, many modifications are possible in the exemplary embodiments without materially departing from the novel teachings and advantages of the present inventive concept. Accordingly, all such modifications are intended to be included within the scope of the present inventive concept.

What is claimed is:

1. An application processor comprising:
a main central processing device configured to receive a first clock signal from at least one external clock source and operate based on the first clock signal when the application processor is in an active mode;
at least one internal clock source configured to generate a second clock signal, a frequency of the second clock signal being lower than a frequency of the first clock signal; and
a sensor sub-system configured to process sensing-data received from at least one sensor in a predetermined cycle when the application processor is in the active mode or a sleep mode,
wherein, when the application processor is in the sleep mode,
the sensor sub-system operates based on the first clock signal when an operating speed is greater than or equal to a threshold value for processing the sensing-data and
the sensor sub-system operates based on the second clock signal when the operating speed is less than the threshold value,
wherein the operating speed is based on temperature information.

2. The application processor of claim 1, wherein the threshold value is set as a reference value, a clock signal input to the sensor sub-system being changed between the first clock signal and the second clock signal with respect to the reference value.

3. The application processor of claim 1, wherein the predetermined cycle includes a wake-up time, a data-read time, and a data-processing time of the at least one sensor.

4. The application processor of claim 3, wherein, when the application processor is in the sleep mode, the sensor sub-system adjusts the data-processing time by adjusting the wake-up time and the data-read time based on the temperature information.

5. The application processor of claim 4, wherein, when the application processor is in the sleep mode, the sensor sub-system determines the operating speed depending on the data-processing time.

6. The application processor of claim 5, wherein, when the application processor is in the sleep mode, the sensor sub-system decreases the operating speed when the data-processing time increases as the wake-up time and the data-read time decrease based on the temperature information.

7. The application processor of claim 5, wherein, when the application processor is in the sleep mode, the sensor sub-system increases the operating speed when the data-processing time decreases as the wake-up time and the data-read time increase based on the temperature information.

8. The application processor of claim 1, wherein the temperature information is generated by sensing an ambient temperature.

9. The application processor of claim 1, wherein the temperature information is received from another source.

10. An electronic device comprising:
at least one function module configured to perform a function operation;
at least one sensor configured to perform a sensing operation;
at least one external clock source configured to generate a first clock signal;
an application processor configured to process sensing-data received from the at least one sensor based on a second clock signal or the first clock signal; and
a power management integrated circuit configured to provide a power to the at least one function module, the at least one sensor, the at least one external clock source, and the application processor,
wherein the application processor comprises:
a main central processing device configured to receive the first clock signal from the at least one external clock source and operate based on the first clock signal when the application processor is in an active mode;
at least one internal clock source configured to generate the second clock signal, a frequency of the second clock signal being lower than a frequency of the first clock signal; and
a sensor sub-system configured to process the sensing-data in a predetermined cycle when the application processor is in the active mode or a sleep mode, and
wherein, when the application processor is in the sleep mode,
the sensor sub-system operates based on the first clock signal when an operating speed is greater than or equal to a threshold value for processing the sensing-data and
the sensor sub-system operates based on the second clock signal when the operating speed is less than the threshold value,
wherein the operating speed is based on temperature information.

11. The electronic device of claim 10, wherein the threshold value is set as a reference value, a clock signal input to the sensor sub-system being changed between the first clock signal and the second clock signal with respect to the reference value.

12. The electronic device of claim 10, further comprising:
a temperature sensing unit configured to generate the temperature information by sensing an ambient temperature or by receiving the temperature information from another source.

13. The electronic device of claim 10, wherein the predetermined cycle includes a wake-up time, a data-read time, and a data-processing time of the at least one sensor.

14. The electronic device of claim 13, wherein, when the application processor is in the sleep mode, the sensor sub-system adjusts the data-processing time by adjusting the wake-up time and the data-read time based on the temperature information.

15. The electronic device of claim 14, wherein, when the application processor is in the sleep mode, the sensor sub-system determines the operating speed depending on the data-processing time.

16. The electronic device of claim 15, wherein, when the application processor is in the sleep mode, the sensor sub-system decreases the operating speed when the data-processing time increases as the wake-up time and the data-read time decrease based on the temperature information.

17. The electronic device of claim 15, wherein, when the application processor is in the sleep mode, the sensor sub-system increases the operating speed when the data-processing time decreases as the wake-up time and the data-read time increase based on the temperature information.

18. An electronic device comprising:
at least one sensor configured to perform a sensing operation;
at least one external clock source configured to generate a first clock signal;
an application processor including at least one internal clock source and a sensor sub-system, the sensor sub-system being configured to process sensing-data received from the at least one sensor in a predetermined cycle based on a second clock signal generated by the at least one internal clock source or the first clock signal, a frequency of the second clock signal being lower than a frequency of the first clock signal; and
a temperature sensing unit configured to generate temperature information by sensing an ambient temperature or by receiving the temperature information from another source,
wherein the sensor sub-system operates based on the first clock signal when the temperature information indicates that the ambient temperature is in a first temperature range and operates based on the second clock signal when the temperature information indicates that the ambient temperature is in a second temperature range different from the first temperature range.

19. The electronic device of claim 18, wherein the predetermined cycle includes a wake-up time, a data-read time, and a data-processing time of the at least one sensor.

20. The electronic device of claim 19,
wherein the sensor sub-system increases an operating speed for processing the sensing-data as the data-processing time decreases and the wake-up time and the data-read time increase when the temperature information indicates that the ambient temperature is in the first temperature range, and
wherein the sensor sub-system decreases the operating speed as the data-processing time increases and the wake-up time and the data-read time decrease when the temperature information indicates that the ambient temperature is in the second temperature range.

* * * * *